(12) United States Patent
Eftimie

(10) Patent No.: US 12,476,476 B2
(45) Date of Patent: Nov. 18, 2025

(54) CIRCUIT FOR BATTERY CHARGING AND SYSTEM SUPPLY, COMBINING CAPACITIVE AND INDUCTIVE CHARGING

(71) Applicant: Dialog Semiconductor (UK) Limited, London (GB)

(72) Inventor: Sabin Eftimie, San Jose, CA (US)

(73) Assignee: Renesas Design (UK) Limited, London (GB)

(*) Notice: Subject to any disclaimer, the term of this patent is extended or adjusted under 35 U.S.C. 154(b) by 869 days.

(21) Appl. No.: 17/549,160

(22) Filed: Dec. 13, 2021

(65) Prior Publication Data

US 2022/0140651 A1 May 5, 2022

Related U.S. Application Data

(63) Continuation of application No. 16/237,139, filed on Dec. 31, 2018, now Pat. No. 11,201,493.

(51) Int. Cl.
| | |
|---|---|
| *H02J 7/00* | (2006.01) |
| *H02J 50/05* | (2016.01) |
| *H02J 50/10* | (2016.01) |

(52) U.S. Cl.
CPC ........ *H02J 7/0071* (2020.01); *H02J 7/00714* (2020.01); *H02J 50/05* (2016.02); *H02J 50/10* (2016.02); *H02J 2207/20* (2020.01)

(58) Field of Classification Search
CPC .................................. H02J 7/02; H02J 50/05
See application file for complete search history.

(56) References Cited

U.S. PATENT DOCUMENTS

| | | | |
|---|---|---|---|
| 5,180,964 | A | 1/1993 | Ewing |
| 5,568,044 | A | 10/1996 | Bittner |

(Continued)

FOREIGN PATENT DOCUMENTS

| | | |
|---|---|---|
| CN | 106130344 | 11/2016 |
| DE | 2323482 | 11/1974 |

(Continued)

OTHER PUBLICATIONS

US Office Action, U.S. Appl. No. 16/237,139, Applicant: Sabin Eftimie, Mail date: Apr. 14, 2021, 22 pages.

(Continued)

*Primary Examiner* — Robert Grant
(74) *Attorney, Agent, or Firm* — Saile Ackerman LLC; Stephen B. Ackerman

(57) ABSTRACT

A power converter and methods with an input terminal, a capacitor, a first output terminal, a second output terminal, an output switch between the first output terminal and the second output terminal, and an inductor are presented. A first terminal of the inductor is connected to the first output terminal. An input switch is connected between the input terminal and a first terminal of the capacitor. A first capacitive charging switch is connected between the first terminal of the capacitor and the second output terminal. A second capacitive charging switch is connected between the second output terminal and a second terminal of the capacitor. A ground switch is connected between the second terminal of the capacitor and a reference potential. The power converter can convert electrical power into electrical power for powering an external device d or into electrical power for charging an external energy storage device.

20 Claims, 23 Drawing Sheets

(56) References Cited

U.S. PATENT DOCUMENTS

| | | | |
|---|---|---|---|
| 6,031,702 | A | 2/2000 | Williams |
| 6,452,816 | B2 | 9/2002 | Kuranuki et al. |
| 6,545,882 | B2 | 4/2003 | Yang |
| 6,885,176 | B2 | 4/2005 | Librizzi |
| 7,098,641 | B2 | 8/2006 | King |
| 7,292,462 | B2 | 11/2007 | Watanabe |
| 7,368,897 | B2 | 5/2008 | Qahouq et al. |
| 7,403,400 | B2 | 7/2008 | Stanley |
| 7,804,282 | B2 | 9/2010 | Bertele |
| 7,960,949 | B2 | 6/2011 | Schoofs |
| 8,018,212 | B1 | 9/2011 | Petricek |
| 8,018,743 | B2 | 9/2011 | Wang et al. |
| 8,049,481 | B2 | 11/2011 | Li et al. |
| 8,498,089 | B2 | 7/2013 | Lorentz |
| 9,160,232 | B2 | 10/2015 | Thomas et al. |
| 9,647,548 | B2 | 5/2017 | Deboy et al. |
| 9,793,804 | B2 | 10/2017 | Zhang et al. |
| 9,929,653 | B1 | 3/2018 | Mercer |
| 9,997,946 | B2 | 6/2018 | Kogler et al. |
| 10,075,064 | B2 | 9/2018 | Perreault |
| 10,298,124 | B2 | 5/2019 | Petersen et al. |
| 10,530,256 | B1 | 1/2020 | Jayaraman et al. |
| 11,201,493 | B2 | 12/2021 | Eftimie |
| 2006/0273772 | A1 | 12/2006 | Groom |
| 2007/0053212 | A1 | 3/2007 | Vieira Formenti |
| 2008/0079410 | A1 | 4/2008 | Ishil et al. |
| 2008/0157723 | A1 | 7/2008 | Xing |
| 2008/0158915 | A1 | 7/2008 | Williams |
| 2009/0010035 | A1 | 1/2009 | Williams |
| 2009/0261786 | A1 | 10/2009 | Hsu et al. |
| 2011/0221604 | A1 | 9/2011 | Johnson |
| 2011/0267018 | A1 | 11/2011 | Tao |
| 2014/0087215 | A1 | 3/2014 | Kim |
| 2014/0266135 | A1 | 9/2014 | Zhak |
| 2014/0368159 | A1 | 12/2014 | Han et al. |
| 2015/0002116 | A1 | 1/2015 | Bernon-Enjalbert et al. |
| 2015/0015088 | A1 | 1/2015 | Petersen |
| 2016/0105110 | A1 | 4/2016 | Houston et al. |
| 2016/0118886 | A1 | 4/2016 | Zhang |
| 2016/0294277 | A1 | 10/2016 | Romeo |
| 2017/0207642 | A1* | 7/2017 | Sato ............... H02J 7/0068 |
| 2017/0300079 | A1 | 10/2017 | Puggelli |
| 2017/0338747 | A1 | 11/2017 | Liang |
| 2017/0338748 | A1* | 11/2017 | Liang ............... H02M 7/483 |
| 2018/0115157 | A1 | 4/2018 | Chan et al. |
| 2018/0183333 | A1 | 6/2018 | Uenaka et al. |
| 2018/0287489 | A1 | 10/2018 | Ozanoglu et al. |
| 2018/0354372 | A1 | 12/2018 | Yang et al. |
| 2018/0375362 | A1* | 12/2018 | Huang ............... H02J 7/02 |
| 2020/0044578 | A1 | 2/2020 | Mangudi et al. |

FOREIGN PATENT DOCUMENTS

| | | |
|---|---|---|
| DE | 2016004202 T5 | 6/2018 |
| DE | 102016225795 A1 | 6/2018 |
| DE | 102016104294 | 12/2020 |

OTHER PUBLICATIONS

US Office Action, U.S. Appl. No. 16/237,139, Applicant: Sabin Eftimie, Mail date: Sep. 10, 2020, 41 pages.

"Buck-Boost Converter Controlled by Hysteretic PWM Method with Input Voltage Feedforward," by Tomonori Watanabe et al., 2011 IEEE 33rd International Telecommunications Energy Conference (INTELEC), Oct. 9-13, 2011, 6 pages.

"The forgotten converter," by Greg Lubarsky, Texas Instruments, Jul. 8, 2015, 10 pages, www.ti.com/lit/wp/sipy005/slpy005.pdf.

DA9318 High-Efficiency, 10 A, High-Voltage Direct Charger, 4 pages, Copyright Dialog Semiconductor 2017, www.dialog-semiconductor.com.

"MediaTek Announces Pump Express(TM) Fast-Charging for Mobile Devices," by HSINCHU, PRNewswire, Feb. 28, 2014, found: http://www.prnewswire.com/news-releases/mediatek-announces-pu . . . .

PCT International Search Report and Written Opinion, PCT Application No. PCT/US2009/064618, Mail date: Jan. 13, 2010, 10 pages.

PCT International Search Report and Written Opinion, PCT Application No. PCT/US2010/023219, Mail date: Apr. 12, 2010, 7 pages.

German Office Action, File No. 10 2017 212 349.4, Applicant: Dialog Semiconductor (UK) Limited, Mail date: Mar. 13, 2018, 9 pages and English language translation, 7 pages.

US Notice of Allowance, U.S. Appl. No. 14/966,009, Applicant: Kogler et al., Mail date: Mar. 5, 2018, 5 pages.

US Office Action, U.S. Appl. No. 14/966,009, Applicant: Kogler et al., Mail date: Oct. 18, 2017, 8 pages.

German Office Action, File No. 10 2015 212 403.7, Applicant: Dialog Semiconductor (UK) Limited, Mail date: Feb. 29, 2016.

US Notice of Allowance, U.S. Appl. No. 16/206,327, Applicant: Jayaraman et al., Mail date: Oct. 8, 2019, 8 pages.

"Development of High Power Density Flying Capacitor Multi-level Converters with Balanced Capacitor Voltage," by Hidemine Obara et al., 2012 IEEE Energy Conversion Congress and Exposition (ECCE), Sep. 15-20, 2012, pp. 330-336.

"Capacitor Voltage Balancing Control of Multilevel DC-DC Converter," by Levy F. Costa et al., 2013 Brazilian Power Electronics Conference, Oct. 27-31, 2013, pp. 332-338.

"Design and Control of Fault-Tolerant Nonisolated Multiphase Multilevel DC-DC Converters for Automotive Power Systems," by Michael Gleissner et al., IEEE Transactions on Industry Applications, vol. 52, No. 2, Mar./Apr. 2016, pp. 1785-1795.

German Office Action, File No. 10 2019 200 112.2, Applicant: Dialog Semiconductor (UK) Limited, Mail date: Aug. 29, 2019, 6 pages.

US Office Action, U.S. Appl. No. 16/206,327, Applicant: Jayaraman et al., Mail date: May 1, 2019, 8 pages.

US Notice of Allowance, U.S. Appl. No. 16/237,139, Applicant: Sabin Eftimie, Mail date: Aug. 13, 2021, 17 pages.

German Office Action, Application No. 10 2019 208 147.9, Applicant: Dialog Semiconductor (UK) Limited, Mail date: Dec. 3, 2024, 3 pages.

German Decision to Grant, Application No. 10 2019 208 147.9, Applicant: Dialog Semiconductor (UK) Limited, Mail date: Apr. 9, 2025, 5 pages.

* cited by examiner

CIRCUIT FOR BATTERY CHARGING AND SYSTEM SUPPLY, COMBINING CAPACITIVE AND INDUCTIVE CHARGING

This application is a Continuation of application Ser. No. 16/237,139 which was filed on Dec. 31, 2018, assigned to a common assignee, and which is herein incorporated by reference in its entirety.

TECHNICAL FIELD

The present document relates to power converters for capacitive and inductive charging of batteries. In particular, the present document relates to power converters capable of charging a battery as well as powering an electronic device e.g. with a stable voltage.

BACKGROUND

Charging a battery may involve different battery charging stages. FIG. 1 shows a diagram illustrating an exemplary charging current $I_{CHG}$ and an exemplary charging voltage $V_{BAT}$ over time. In FIG. 1, the displayed charging stages include: a pre-charge charging stage 1, a constant current (CC) charging stage 2, a charging current step down charging stage 3 which is specific to high current direct charging, a constant voltage (CV) charging stage 4, an end-of-charge (EOC) charging stage 5, and an after charge charging stage 6. It should be noted that—depending on the implementation—some of the displayed charging stages may be optional.

The present disclosure distinguishes between two types of chargers which may be applied during the different battery charging stages: a direct capacitive charger and a multi-level inductive charger. In FIGS. 2 and 3, an exemplary power converter 20 is illustrated which comprises both a direct capacitive charger 21 and a multi-level inductive charger 22. As can be seen in FIG. 3, the direct capacitive charger 21 comprises a capacitor CFLY1 and four switching elements SW1, SW2, SW3, and SW4. Optionally, the direct capacitive charger 21 may comprise a second direct capacitive charger 211 connected in parallel and comprising capacitor CFLY2 and four switching elements SW5, SW6, SW7, and SW8. The multi-level inductive charger 22 comprises an inductor 221, capacitor CFLY3 and four switching elements SW9, SW10, SW11, and SW12, and output switch 222 arranged between a first output terminal 223 and a second output terminal 225 of the power converter 20. At the first output terminal 223, a system 224 (such as e.g. smartphone) may be supplied with electrical power, whereas at the second output terminal 225 a battery 226 is connected. Said battery 226 may be charged e.g. according to the charging stages depicted in FIG. 1.

On the on hand, the direct capacitive charger 21 taken alone (i.e. without the multi-level inductive charger 22) would have a plurality of disadvantages. For example, the direct capacitive charger 21 taken alone would neither be able to pre-charge a depleted battery, nor would it be able to charge the battery with a constant voltage, e.g., during the CV charging stage 4 of FIG. 1. Further, the direct capacitive charger 21 would not be able to accurately end the battery charging when the charging current is lower than a certain limit. Also, the direct capacitive charger 21 alone would not be capable of charging with any voltage on the input (for example 5V). In particular, it would require a voltage source capable of finely controlling the input voltage to approximately two times the battery voltage. Furthermore, the direct capacitive charger 21 could not back boost the power from the battery to the input for a fixed voltage power delivery (for example 5V).

On the other hand, the multi-level inductive charger 22 alone (i.e. without the direct capacitive charger 21) cannot achieve the same high efficiency as the capacitive charger for similar power field effect transistor (FET) sizes and similar technology parameters. In addition, the multi-level inductive charger 22 cannot eliminate the power losses of the output switch 222 and the inductor 221, which is especially impacting efficiency during high current charging (i.e. during CC stage 2). Thus, the power converter 20 illustrated in FIGS. 2 and 3 combines the advantages of both charger types during the various charging stages depicted in FIG. 1. To be more specific, the charging process of a battery may be optimized by controlling the switching elements of the direct capacitive charger 21 and the multi-level inductive charger 22 during the various charging stages depicted in FIG. 1.

SUMMARY

The present document addresses the above mentioned technical problems. In particular, the present document addresses the technical problem of providing novel power converters suitable for both battery charging and system supply, and capable of combining the advantages of both capacitive and inductive charging. According to an aspect, a power converter is described. The power converter may comprise an input terminal, a capacitor, a first output terminal, a second output terminal, an output switch between the first output terminal and the second output terminal, and an inductor, wherein a first terminal of the inductor is connected to the first output terminal. The power converter may further comprise an input switch connected between the input terminal and a first terminal of the capacitor, a first capacitive charging switch connected between the first terminal of the capacitor and the second output terminal, a second capacitive charging switch connected between the second output terminal and a second terminal of the capacitor, a ground switch connected between the second terminal of the capacitor and a reference potential, a first inductive charging switch connected between the first terminal of the capacitor and a second terminal of the inductor, and a second inductive charging switch connected between the second terminal of the inductor and the second terminal of the capacitor.

Throughout this document, the term "reference potential" is meant in its broadest possible sense. In particular, "reference potential" is not limited to a reference point with a direct physical connection to earth such as e.g. ground. Rather, the term "reference potential" may refer to any reference point to which and from which electrical currents may flow, or from which voltages may be measured.

Each of the switches may be implemented with any suitable device, such as, for example, a metal-oxide-semiconductor field effect transistor MOSFET, an insulated-gate bipolar transistor IGBT, a MOS-gated thyristor, or other suitable power device. Each switch has a gate to which a respective driving voltage or control signal may be applied to turn the switch on (i.e. to close the switch) or to turn the switch off (i.e. to open the switch).

The described power converter enables combined capacitive and inductive charging with a reduced number of circuit elements compared to prior art solutions. For instance, in comparison to the power converter 2 depicted in FIG. 3 and discussed in the above background section, the number of switches is reduced by two and the number of capacitors is reduced by one. Specifically, the described power converter enables combined capacitive and inductive charging of an energy storage device such as e.g. a battery or a supercapacitor connected to the second output terminal depending on the state of charge of said external energy storage device. As described in the following description, the power converter may be configured to convert electrical power at the input terminal into electrical power for powering an external electronic device at the first output terminal, and/or into electrical power for charging the external energy storage device at the second output terminal. Depending on the state of charge of the external energy storage device, the power converter may be configured to supply electrical power to the external electronic device simultaneously while charging the external energy storage device connected to the second output terminal.

For example, the power converter may be configured, when in a capacitive charging mode, to turn off the output switch, the first inductive charging switch and the second inductive charging switch, and to control the remaining switches such that an external storage device connected to the second output terminal is charged with a constant charging current. As an advantage, charging with high current and high efficiency can be achieved. Moreover, the charging current does neither pass through the inductor nor through the output switch, so the corresponding inductive, capacitive and/or resistive losses are eliminated.

The power converter may be configured to switch between a first phase and a second phase. The power converter may be further configured, during the first phase, to turn on the input switch and the second capacitive charging switch, and to turn off the first capacitive charging switch and the ground switch for generating an electrical path from the input terminal via the capacitor to the second output terminal. Hence, said first phase may be a charging phase during which the capacitor is charged via said electrical path. The other way round, the power converter may be configured, during the second phase, to turn on the ground switch and the first capacitive charging switch, and to turn off the input switch and the second capacitive charging switch for generating an electrical path from the reference potential via the capacitor to the second output terminal. That is, said second phase may be a discharging phase during which the capacitor is discharged via said electrical path.

In other words, in the capacitive charging mode, the first and the second capacitive charging switches may be responsible for transferring electrical energy from the capacitor to the second output terminal of the power converter. This is the reason why—within this document—the first and the second capacitive charging switches are denoted "capacitive" charging switches. At the same time, within the capacitive charging mode, the first inductive charging switch and the second inductive charging switch may be permanently turned off.

The described power converter may also be configured, when in an inductive charging mode, to turn off the first capacitive charging switch and the second capacitive charging switch, and to control the remaining switches for regulating an output voltage at the first output terminal and/or the second output terminal. The power converter may be configured to switch between a first time interval, a second time interval and a third time interval. The power converter may be configured, during the first time interval, to turn on the ground switch and the first inductive charging switch, and to turn off the input switch and the second inductive charging switch for generating an electrical path from the reference potential via the capacitor and via the inductor to the first output terminal. In this disclosure, the terms "phase" and "time interval" are used as synonyms. Then, the power converter may be configured, during the second time interval, to turn on the input switch and the second inductive charging switch, and to turn off the ground switch and the first inductive charging switch for generating an electrical path from the input terminal via the capacitor and via the inductor to the first output terminal. Finally, the power converter may be configured, during the third time interval, to turn off the ground switch and the second inductive charging switch, and to turn on the input switch and the first inductive charging switch for generating an electrical path from the input terminal via the inductor to the first output terminal. As a result, the power converter may be in a first switching state in which the capacitor is discharged and the inductor is demagnetized during the first time interval. During the second time interval, the power converter may be in a second switching state during which the capacitor is charged and the inductor is demagnetized. Finally, during the third time interval, the power converter may be in a third switching state during which the inductor is magnetized. By switching between these three switching states, the power converter may supply electrical power with a regulated output voltage to the first output terminal. For example, the output switch may be turned off such that electrical power is exclusively provided to said first output terminal.

In other words, in the inductive charging mode, it may be the duty of the first and the second inductive charging switches to transfer electrical energy via the inductor to the first output terminal of the power converter. This is the reason why—within this document—the first and the second inductive charging switches are denoted "inductive" charging switches. At the same time, within the inductive charging mode, the first capacitive charging switch and the second capacitive charging switch may be permanently turned off.

Alternatively or additionally, electrical power may also be provided to the second output terminal. Particularly, the power converter may be configured to turn on the output switch, and to control the remaining switches such that an external storage device connected to the second output terminal is charged with a constant charging voltage. Alternatively, for charging that external storage device connected to the second output terminal during the third time interval, the inductor may be demagnetized by turning on the ground switch and the second inductive charging switch and by turning off the input switch and the first inductive charging switch to generate an electrical path from the reference potential via the inductor to the second output terminal. In other words, the power converter may be configured, during a third time interval, to turn on the ground switch and the second inductive charging switch, and to turn off the input switch and the first inductive charging switch for generating an electrical path from the reference potential via the inductor to the second output terminal. As a result of this alternative configuration within the third time interval, the capacitor is discharged and the inductor is magnetized during the first time interval, the capacitor is charged and the inductor is magnetized during the second time interval, and the inductor is demagnetized during the third time interval. By switching between these three switching states, the power converter may supply electrical power with a regulated output voltage not only to the first output terminal for powering the external electronic device, but may charge an external energy storage device connected to the second output terminal with a regulated, nearly constant voltage.

The power converter may comprise a second capacitor, a third capacitive charging switch, a fourth capacitive charging switch, a fifth capacitive charging switch, and a sixth capacitive charging switch. The third capacitive charging switch may be connected between the input terminal and a first terminal of the second capacitor. The fourth capacitive charging switch may be connected between the first terminal of the second capacitor and the second output terminal. The fifth capacitive charging switch may be connected between the second output terminal and a second terminal of the second capacitor. The sixth capacitive charging switch may be connected between the second terminal of the second capacitor and the reference potential.

The power converter may be further configured to, during the second phase, to turn on the third capacitive charging switch and the fifth capacitive charging switch, and to turn off the fourth capacitive charging switch and the sixth capacitive charging switch for generating an electrical path from the input terminal via the second inductor to the second output terminal. The power converter may be further configured to, during the first phase, to turn off the third capacitive charging switch and the fifth capacitive charging switch, and to turn on the fourth capacitive charging switch and the sixth capacitive charging switch for generating an electrical path from the reference potential via the second inductor to the second output terminal.

The third capacitive charging switch or the fourth capacitive charging switch may be implemented as a transistor and used as voltage-controlled current source and the power converter may be configured to turn off said transistor if a transistor current through said transistor falls below a threshold value. The power converter may further comprise a comparator configured to compare the transistor current with said threshold value.

The power converter may be configured to, in a back-boost mode, to turn off the first and the second capacitive charging switches and to switch between a magnetizing switching state and a demagnetizing switching state. In the magnetizing switching state, the second inductive charging switch and the ground switch are turned on. In the demagnetizing switching state, the input switch and the first inductive charging switch are turned on. Further, the power converter may be configured to, in a back-boost mode, to turn off the first and the second capacitive charging switches and to switch between a primary switching state in which the second inductive charging switch and the ground switch are turned on, a secondary switching state in which the first inductive charging switch and the ground switch are turned on, and a tertiary switching state in which the second inductive charging switch and the input switch are turned on.

The power converter may further comprise a first reverse current protection switch configured to connect a body of the first capacitive charging switch to a first reference potential, and a second reverse current protection switch configured to connect a body of the first inductive charging switch to a second reference potential. The first reference potential may be the same as or different from the second reference potential. In particular, the first and the second reference potentials may be different from the reference potential to which the ground switch is connected. Also, the power converter may further comprise a third reverse current protection switch configured to connect a body of the fourth capacitive charging switch to the reference potential.

According to another aspect, a power converter is presented with an input terminal, a capacitor, a first output terminal, a second output terminal, an output switch between the first output terminal and the second output terminal, and an inductor, wherein a first terminal of the inductor is connected to the first output terminal. The power converter may comprise a first inductive charging switch connected between the input terminal and a second terminal of the inductor. The power converter may comprise a second inductive charging switch connected between the second terminal of the inductor and a reference potential. The power converter may comprise a first capacitive charging switch connected between the input terminal and a first terminal of the capacitor. The power converter may comprise a second capacitive charging switch connected between the first terminal of the capacitor and the second output terminal. The power converter may comprise a third capacitive charging switch connected between the second output terminal and a second terminal of the capacitor. The power converter may comprise a fourth capacitive charging switch connected between the second terminal of the capacitor and the reference potential.

According to yet another aspect, a method for operating a power converter is presented, wherein the power converter comprises an input terminal, a capacitor, a first output terminal, a second output terminal, an output switch between the first output terminal and the second output terminal, and an inductor, wherein a first terminal of the inductor is connected to the first output terminal. The method may comprise connecting an input switch between the input terminal and a first terminal of the capacitor. The method may comprise connecting a first capacitive charging switch between the first terminal of the capacitor and the second output terminal. The method may comprise connecting a second capacitive charging switch between the second output terminal and a second terminal of the capacitor. The method may comprise connecting a ground switch between the second terminal of the capacitor and a reference potential. The method may comprise connecting a first inductive charging switch between the first terminal of the capacitor and a second terminal of the inductor. The method may comprise connecting a second inductive charging switch between the second terminal of the inductor and the second terminal of the capacitor.

Further, the method may comprise converting electrical power at the input terminal into electrical power for powering an external electronic device at the first output terminal, or into electrical power for charging an external energy storage device at the second output terminal.

The method may comprise, in a capacitive charging mode, turning off the output switch, the first inductive charging switch and the second inductive charging switch, and controlling the remaining switches such that an external storage device connected to the second output terminal is charged with a constant charging current.

The method may further comprise, during a first phase, turning on the input switch and the second capacitive charging switch, and turning off the first capacitive charging switch and the ground switch for generating an electrical path from the input terminal via the capacitor to the second output terminal. The method may further comprise, during a second phase, turning on the ground switch and the first capacitive charging switch, and turning off the input switch and the second capacitive charging switch for generating an electrical path from the reference potential via the capacitor to the second output terminal.

The method may comprise, in an inductive charging mode, turning off the first capacitive charging switch and the second capacitive charging switch, and controlling the remaining switches for regulating an output voltage at the first output terminal.

Further, the method may comprise, during a first time interval, turning on the ground switch and the first inductive charging switch, and turning off the input switch and the second inductive charging switch for generating an electrical path from the reference potential via the capacitor and via the inductor to the first output terminal. The method may further comprise, during a second time interval, turning on the input switch and the second inductive charging switch, and turning off the ground switch and the first inductive charging switch for generating an electrical path from the input terminal via the capacitor and via the inductor to the first output terminal. Finally, the method may further comprise, during a third time interval, turning off the ground switch and the second inductive charging switch, and turning on the input switch and the first inductive charging switch for generating an electrical path from the input terminal via the inductor to the first output terminal.

The method may comprise turning on the output switch, and controlling the remaining switches such that an external storage device connected to the second output terminal is charged with a constant charging voltage.

The method may further comprise, during the third time interval, turning on the ground switch and the second inductive charging switch, and turning off the input switch and the first inductive charging switch for generating an electrical path from the reference potential via the inductor to the second output terminal.

The method may further comprise adding to the power converter a second capacitor, a third capacitive charging switch, a fourth capacitive charging switch, a fifth capacitive charging switch, and a sixth capacitive charging switch. The method may further comprise connecting the third capacitive charging switch between the input terminal and a first terminal of the second capacitor. The method may further comprise connecting the fourth capacitive charging switch between the first terminal of the second capacitor and the second output terminal. The method may further comprise connecting the fifth capacitive charging switch between the second output terminal and a second terminal of the second capacitor. The method may further comprise connecting the sixth capacitive charging switch between the second terminal of the second capacitor and the reference potential.

The method may further comprise, during the first phase, turning on the third capacitive charging switch and the fifth capacitive charging switch, and turning off the fourth capacitive charging switch and the sixth capacitive charging switch for generating an electrical path from the input terminal via the second inductor to the second output terminal. Moreover, the method may further comprise, during the second phase, turning off the third capacitive charging switch and the fifth capacitive charging switch, and turning on the fourth capacitive charging switch and the sixth capacitive charging switch for generating an electrical path from the reference potential via the second inductor to the second output terminal.

The method may further comprise implementing the third capacitive charging switch or the fourth capacitive charging switch as a transistor and using said transistor as voltage-controlled current source. The method may further comprise turning off said transistor if a transistor current through said transistor falls below a threshold value. The method may further comprise comparing, using a comparator, the transistor current with the threshold value.

According to yet another aspect, it is presented a method of operating a power converter with an input terminal, a capacitor, a first output terminal, a second output terminal, an output switch between the first output terminal and the second output terminal, and an inductor, wherein a first terminal of the inductor is connected to the first output terminal. The method may comprise connecting a first inductive charging switch between the input terminal and a second terminal of the inductor. The method may comprise connecting a second inductive charging switch between the second terminal of the inductor and a reference potential. The method may comprise connecting a first capacitive charging switch connected the input terminal and a first terminal of the capacitor. The method may comprise connecting a second capacitive charging switch between the first terminal of the capacitor and the second output terminal. The method may comprise connecting a third capacitive charging switch between the second output terminal and a second terminal of the capacitor. The method may comprise connecting a fourth capacitive charging switch between the second terminal of the capacitor and the reference potential.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple", "connect", "coupled" or "connected" refers to elements being in electrical communication with each other, whether directly connected e.g., via wires, or in some other manner.

BRIEF DESCRIPTION OF THE DRAWINGS

The invention is explained below in an exemplary manner with reference to the accompanying drawings, wherein.

DESCRIPTION

Figure 4:
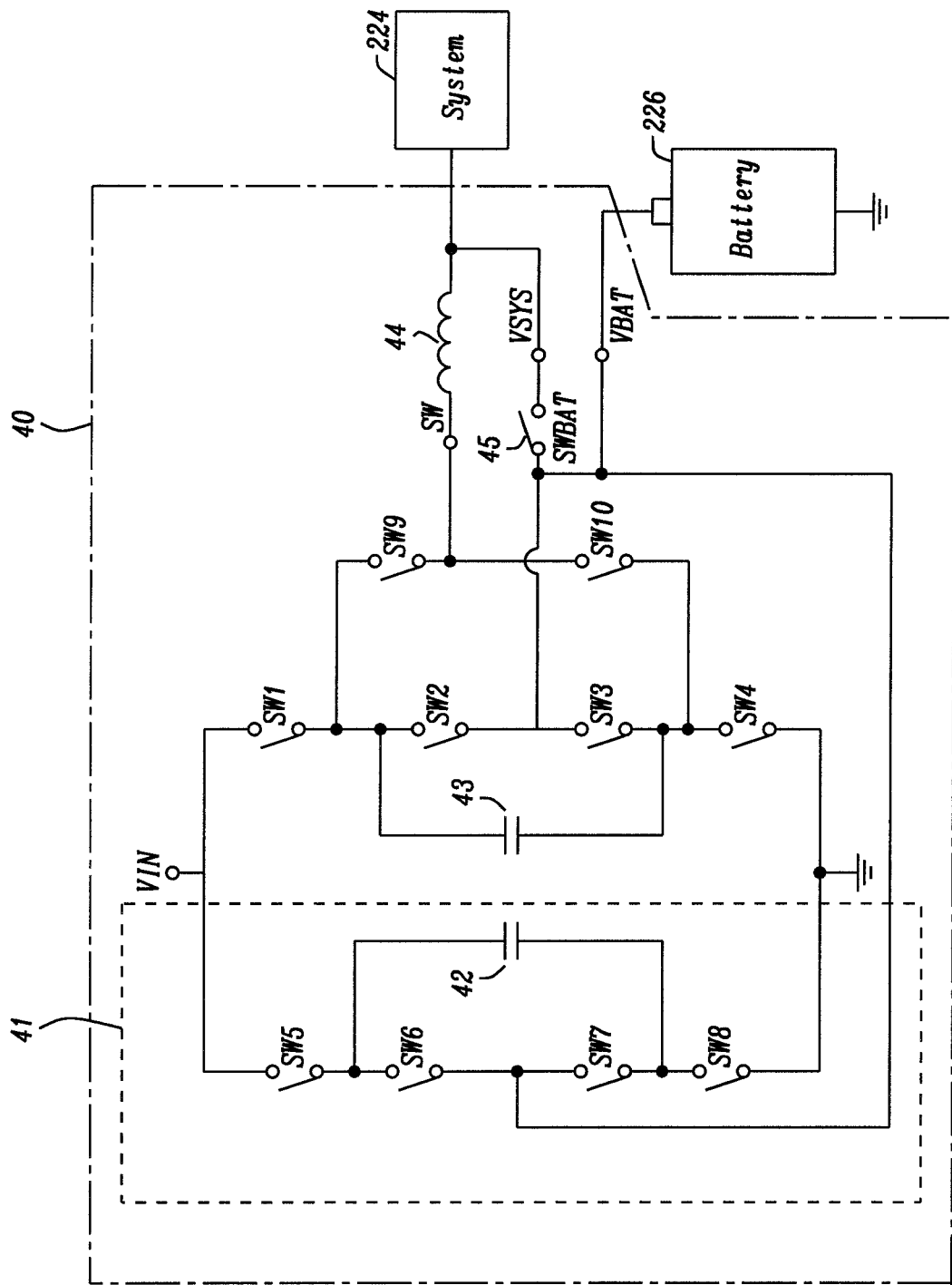
FIG. 4 shows an exemplary power converter for combined capacitive and inductive charging.

FIG. 4 shows an exemplary power converter 40 according to the teachings of the present disclosure. The exemplary power converter 40 comprises an input terminal, a capacitor 43, a first output terminal, a second output terminal, an output switch 45 between the first output terminal and the second output terminal, and an inductor 44, wherein a first terminal of the inductor 44 is connected to the first output terminal. The power converter 40 further comprises an input switch SW1 connected between the input terminal and a first terminal of the capacitor 43, a first capacitive charging switch SW2 connected between the first terminal of the capacitor 43 and the second output terminal, a second capacitive charging switch SW3 connected between the second output terminal and a second terminal of the capacitor 43, a ground switch SW4 connected between the second terminal of the capacitor 43 and a reference potential, a first inductive charging switch SW9 connected between the first terminal of the capacitor 43 and a second terminal of the inductor 44, and a second inductive charging switch SW10 connected between the second terminal of the inductor 44 and the second terminal of the capacitor 43. The power converter 40 converts electrical power at the input terminal into electrical power for powering the external electronic device 224 at the first output terminal, and/or into electrical power for charging the external energy storage device 226 at the second output terminal.

Optionally, the exemplary power converter 40 may comprise an optional capacitive charger 41 comprising a second capacitor 42, a third capacitive charging switch SW5, a fourth capacitive charging switch SW6, a fifth capacitive charging switch SW7, and a sixth capacitive charging switch SW8. The third capacitive charging switch SW5 is connected between the input terminal and a first terminal of the second capacitor 42. The fourth capacitive charging switch SW6 is connected between the first terminal of the second capacitor 42 and the second output terminal. The fifth capacitive charging switch is connected between the second output terminal and a second terminal of the second capacitor 42. The sixth capacitive charging switch SW8 is connected between the second terminal of the second capacitor 42 and the reference potential.

Figure 5:
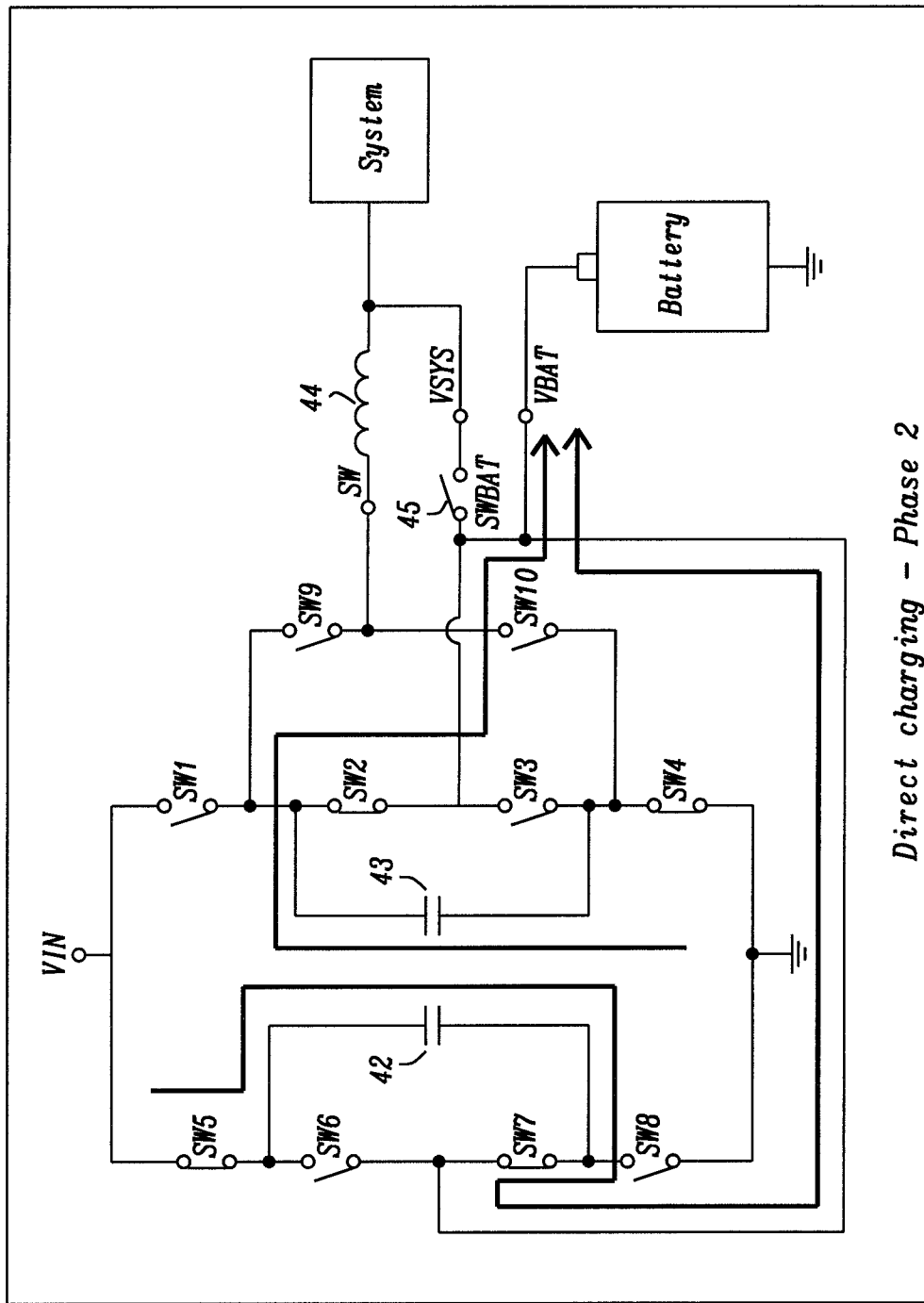
FIG. 5 shows current flows during capacitive charging.
Figure 6:
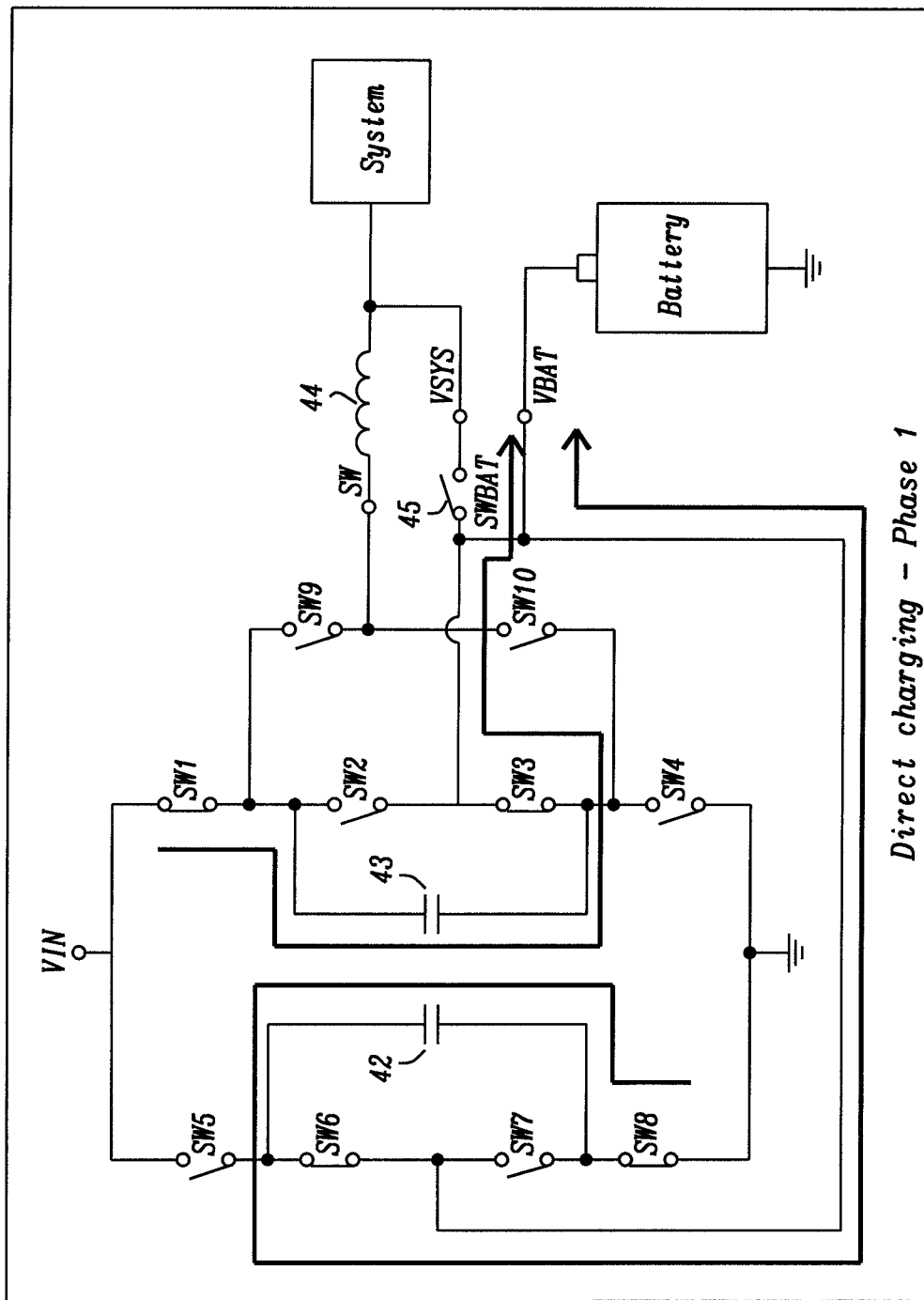
FIG. 6 shows further current flows during capacitive charging.

FIGS. 5 and 6 show electrical currents within the exemplary power converter 40 when operated in a capacitive charging mode. In the capacitive charging mode, the power converter turns off the output switch, the first inductive charging switch and the second inductive charging switch, and controls the remaining switches such that the external storage device connected to the second output terminal is charged with a constant charging current.

During a first phase illustrated in FIG. 6, the power converter 40 turns on the input switch SW1 and the second capacitive charging switch SW10, and turns off the first capacitive charging switch SW9 and the ground switch SW4 for generating an electrical path from the input terminal via the capacitor 43 to the second output terminal. Hence, said first phase may be a charging phase during which the capacitor 43 is charged via said electrical path. At the same time, the power converter turns off the third capacitive charging switch SW5 and the fifth capacitive charging switch SW7, and turns on the fourth capacitive charging switch SW6 and the sixth capacitive charging switch SW8 for generating an electrical path from the reference potential via the second inductor to the second output terminal. Put in a different way, the capacitor 43 is charged while the second capacitor 42 is discharged.

During a second phase illustrated in FIG. 5, the power converter turns on the ground switch SW4 and the first capacitive charging switch SW2, and turns off the input switch SW1 and the second capacitive charging switch SW3 for generating an electrical path from the reference potential via the capacitor 42 to the second output terminal. That is, said second phase may be a discharging phase during which the capacitor 42 is discharged via said electrical path. At the same time, the power converter 40 turns on the third capacitive charging switch SW5 and the fifth capacitive charging switch SW7, and turns off the fourth capacitive charging switch SW6 and the sixth capacitive charging SW8 for generating an electrical path from the input terminal via the second inductor 42 to the second output terminal. Put in a different way, in the second phase, the capacitor 43 is discharged while the second capacitor 42 is charged.

Figure 1:
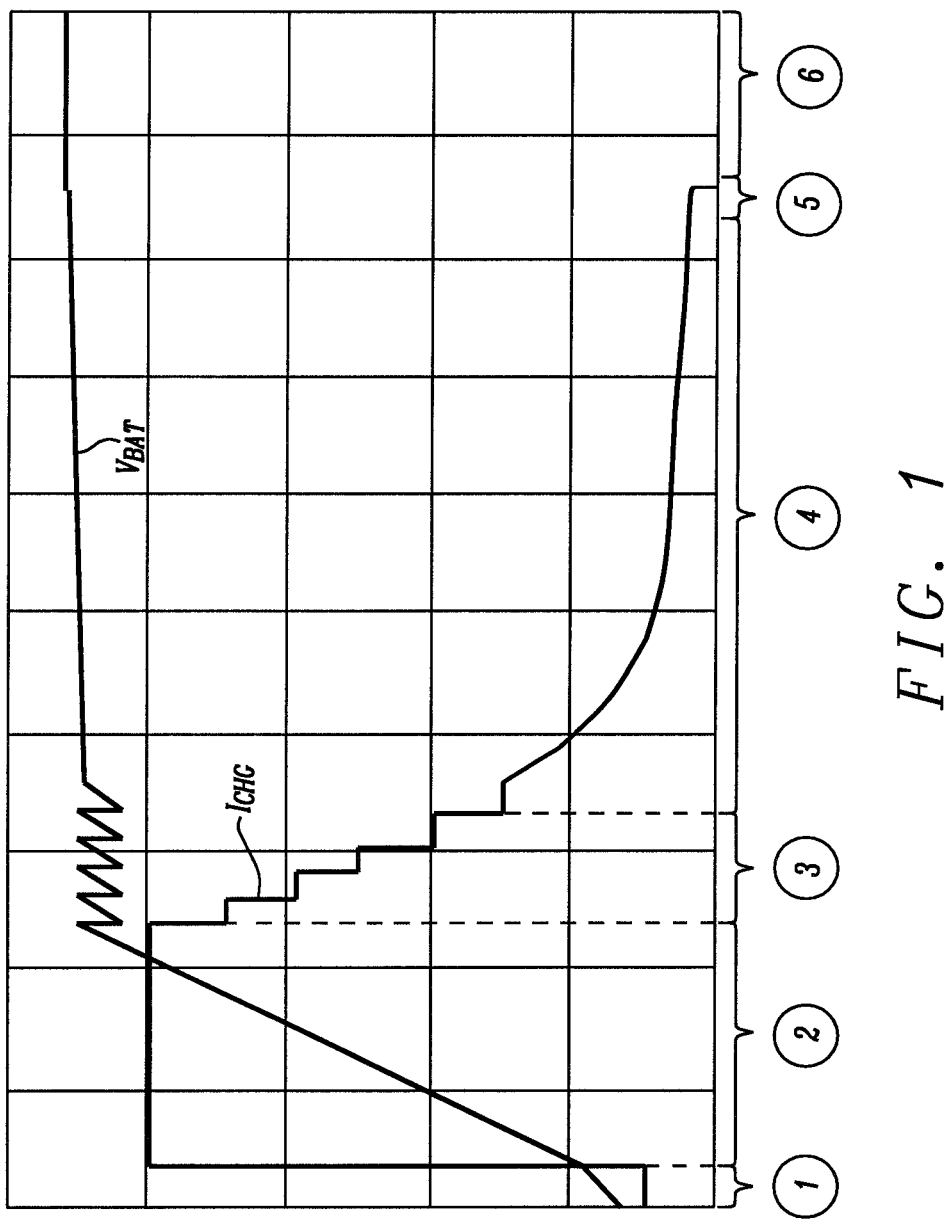
FIG. 1 shows a diagram with different battery charging stages.
Figure 2:
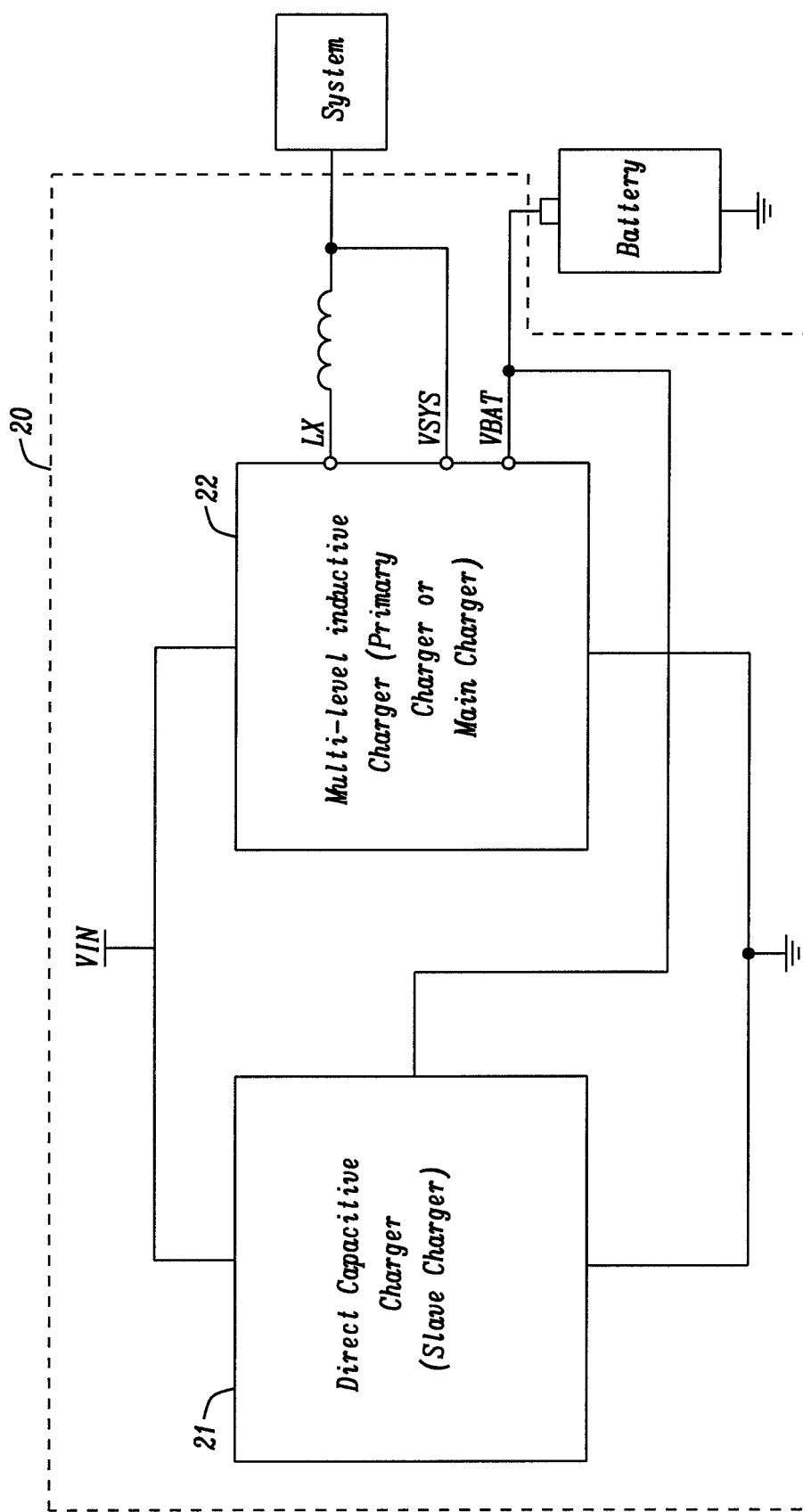
FIG. 2 shows an exemplary power converter with a direct capacitive charger and a multi-level inductive charger.
Figure 3:
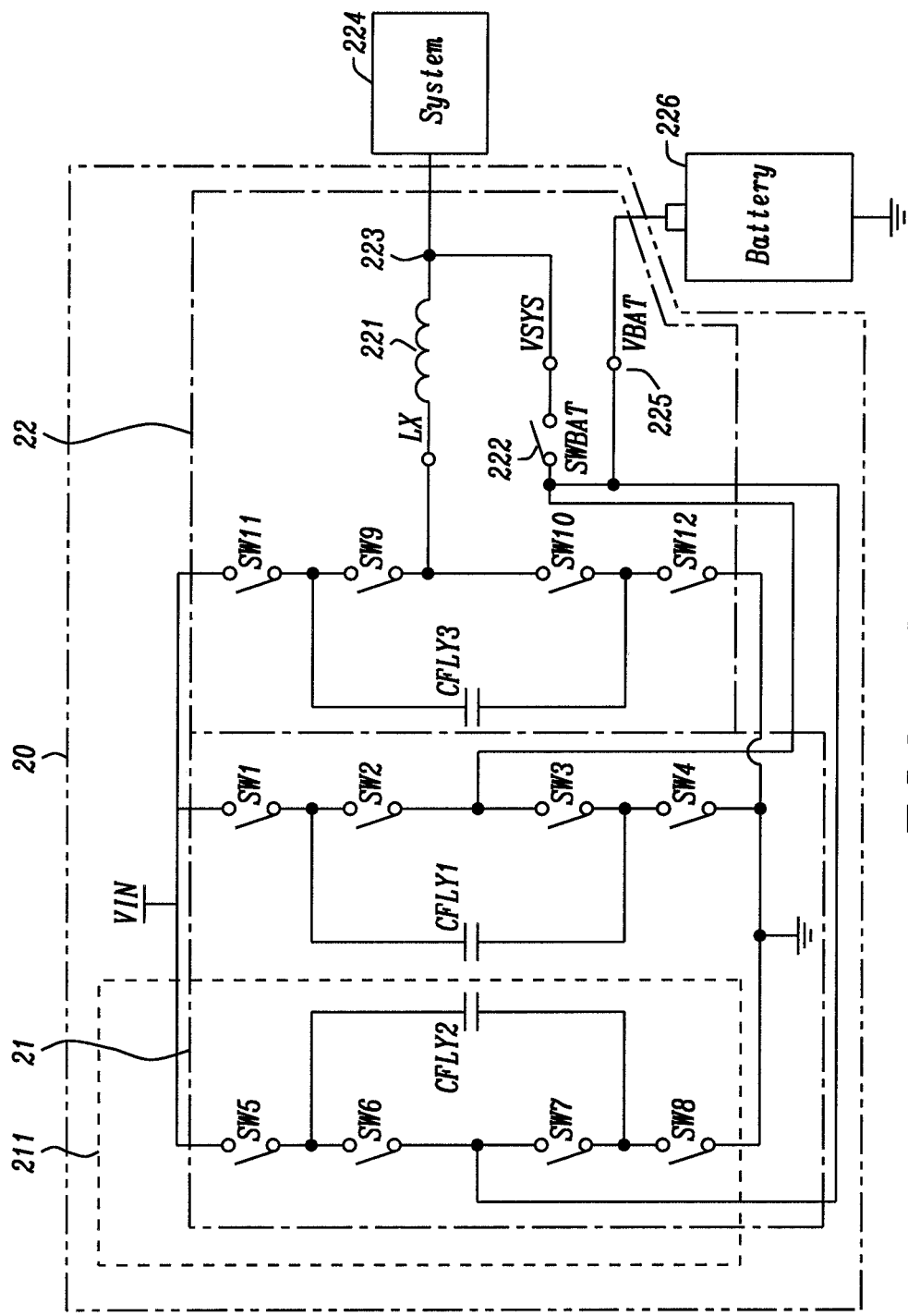
FIG. 3 shows an exemplary power converter with a direct capacitive charger and a multi-level inductive charger.
Figure 7:
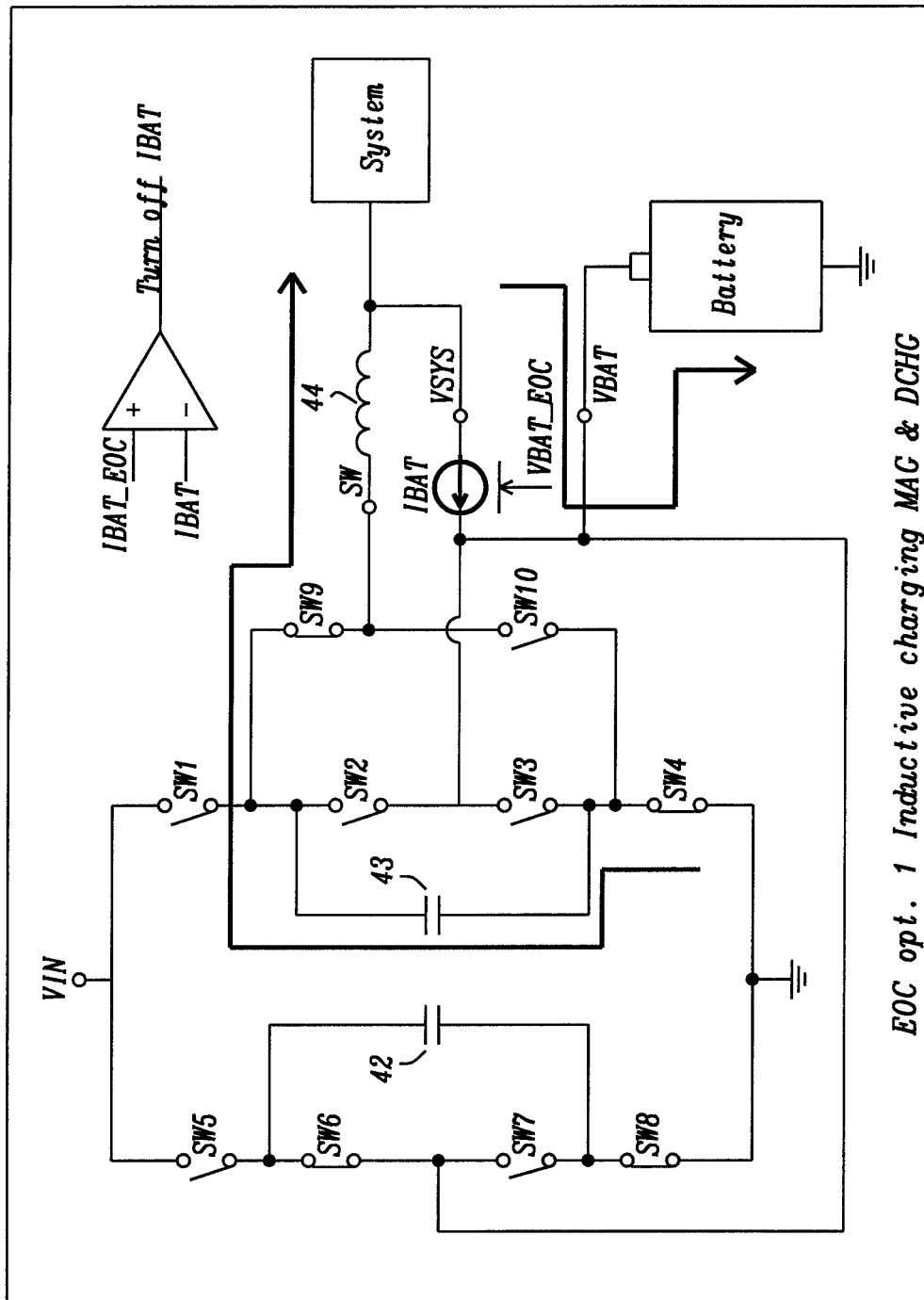
FIG. 7 shows current flows according to a first option for EOC inductive charging.
Figure 8:
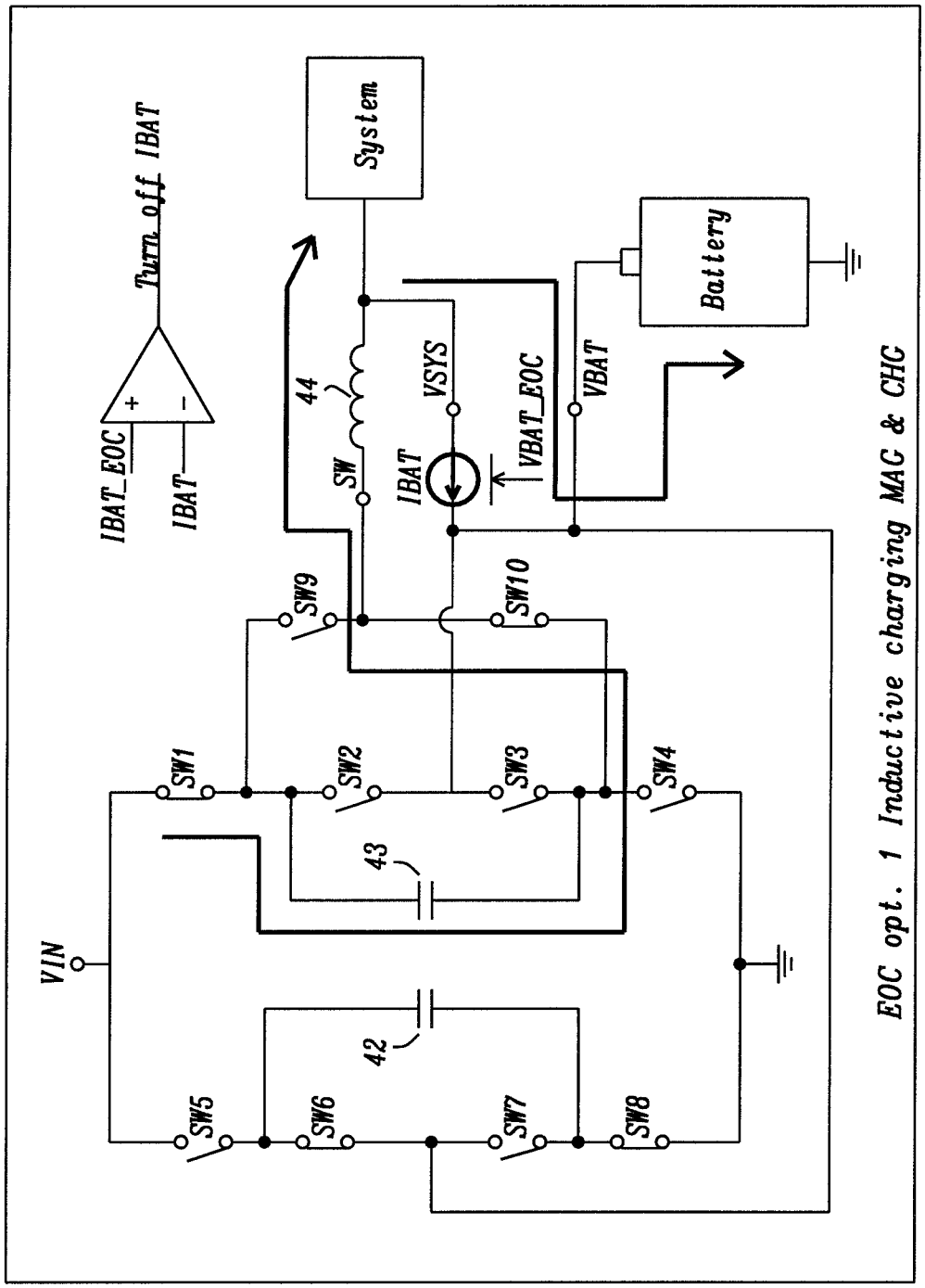
FIG. 8 shows current flows according to the first option for EOC inductive charging.
Figure 9:
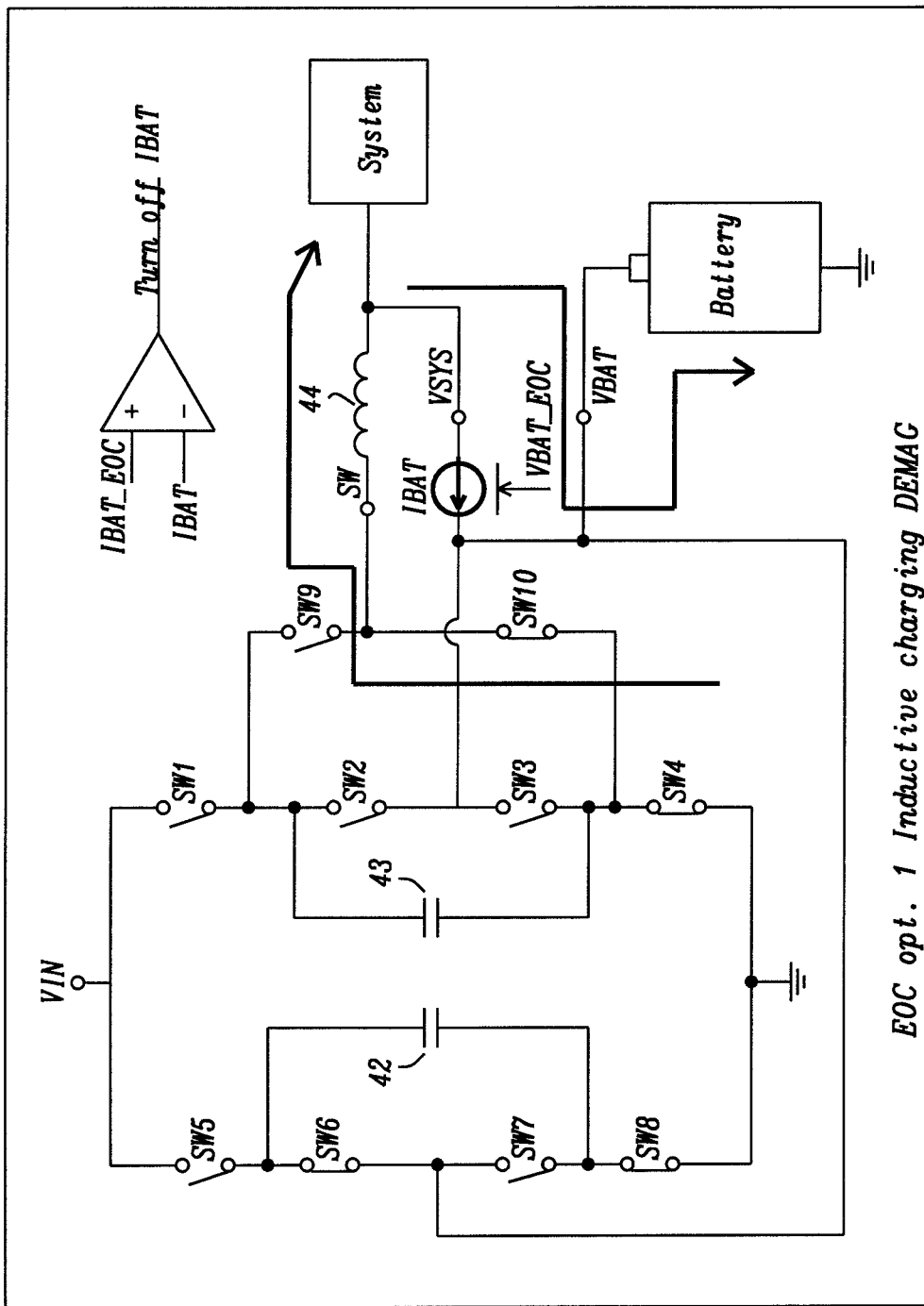
FIG. 9 shows current flows according to the first option for EOC inductive charging.

In FIGS. 7, 8, and 9, a first option for optimizing the EOC stage 5 of FIG. 1 is illustrated. The inductive charger is used to supply VSYS to the external system (as will be described later), while the output switch 45 (e.g. a FET) between VSYS and VBAT is used as a voltage-controlled current source. The IBAT current is set through the output switch 45 in such a way that VBAT is kept to a value equal to VBAT_EOC. While the battery at the second output terminal is still charging, the IBAT current will decrease. When IBAT reaches below a pre-set value IBAT_EOC, the output switch 45 (IBAT current source) is switched off.

Figure 10:
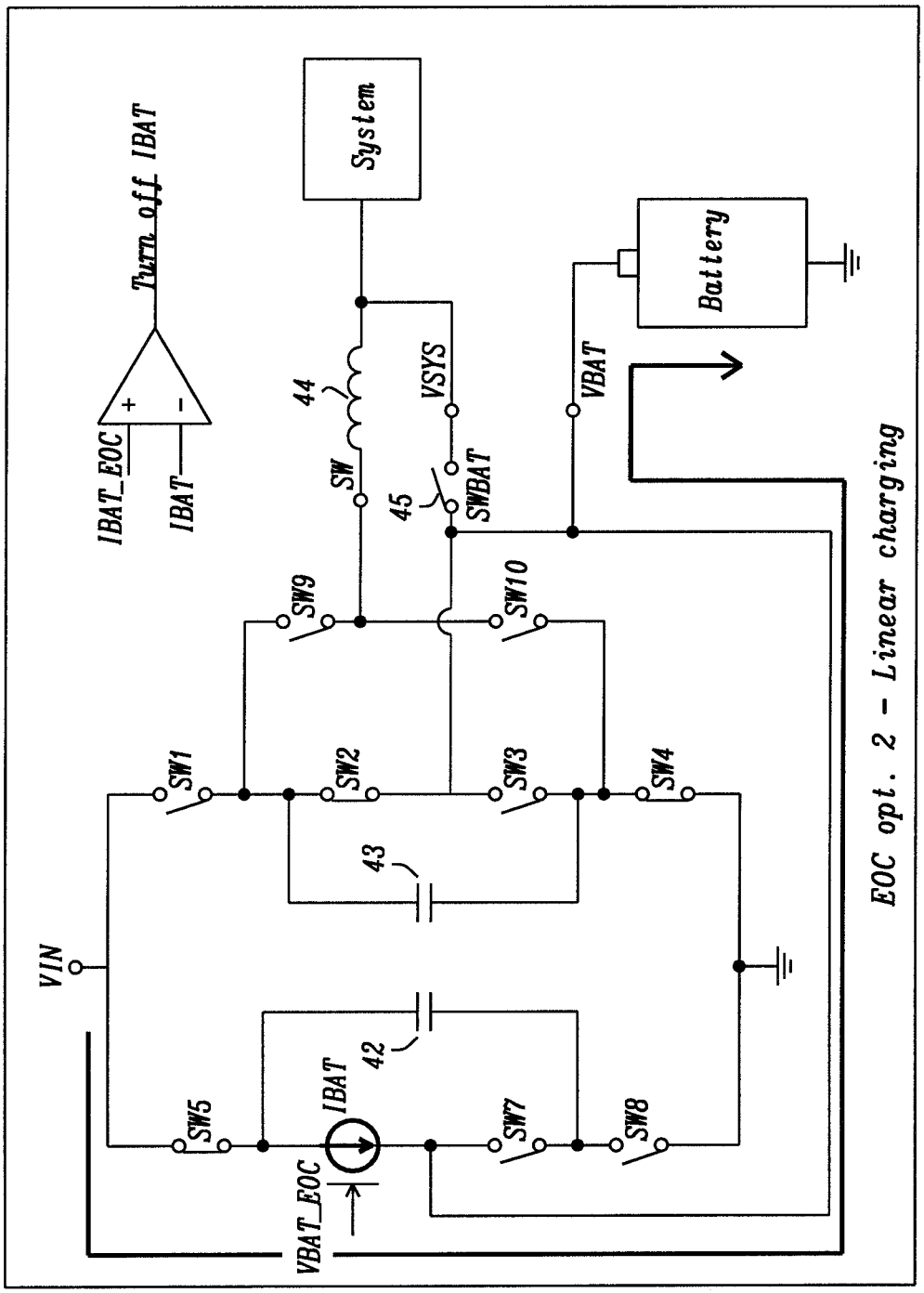
FIG. 10 shows current flows according to a second option for EOC inductive charging.

In FIG. 10, a second option for optimizing the EOC stage 5 of FIG. 1 is illustrated. The left (optional) branch of the capacitive charger is used as a linear charger, while the inductive charger is being used only to supply power to VSYS and it is disconnected from VBAT, i.e. the output switch 45 between VSYS and VBAT is off.

This method has the advantage that the two power converters (linear charger on the left-side and multi-level converter on the right side) are independent from each other. Thus IBAT control is more stable and less impacted by load transients on VSYS. The end-of-charge mechanism is similar to option 1 (IBAT and IBAT_EOC comparator), with the difference that IBAT current source is being implemented within the direct charger branch instead of BAT FET. In other words, in FIG. 10, the third capacitive charging switch SW5 or the fourth capacitive charging switch SW6 is implemented as a transistor and used as voltage-controlled current source and the power converter 40 turns off said transistor if a transistor current through said transistor falls below a threshold value. As depicted in FIG. 10, the power converter 40 further comprise a comparator configured to compare the transistor current with said threshold value.

Figure 11:
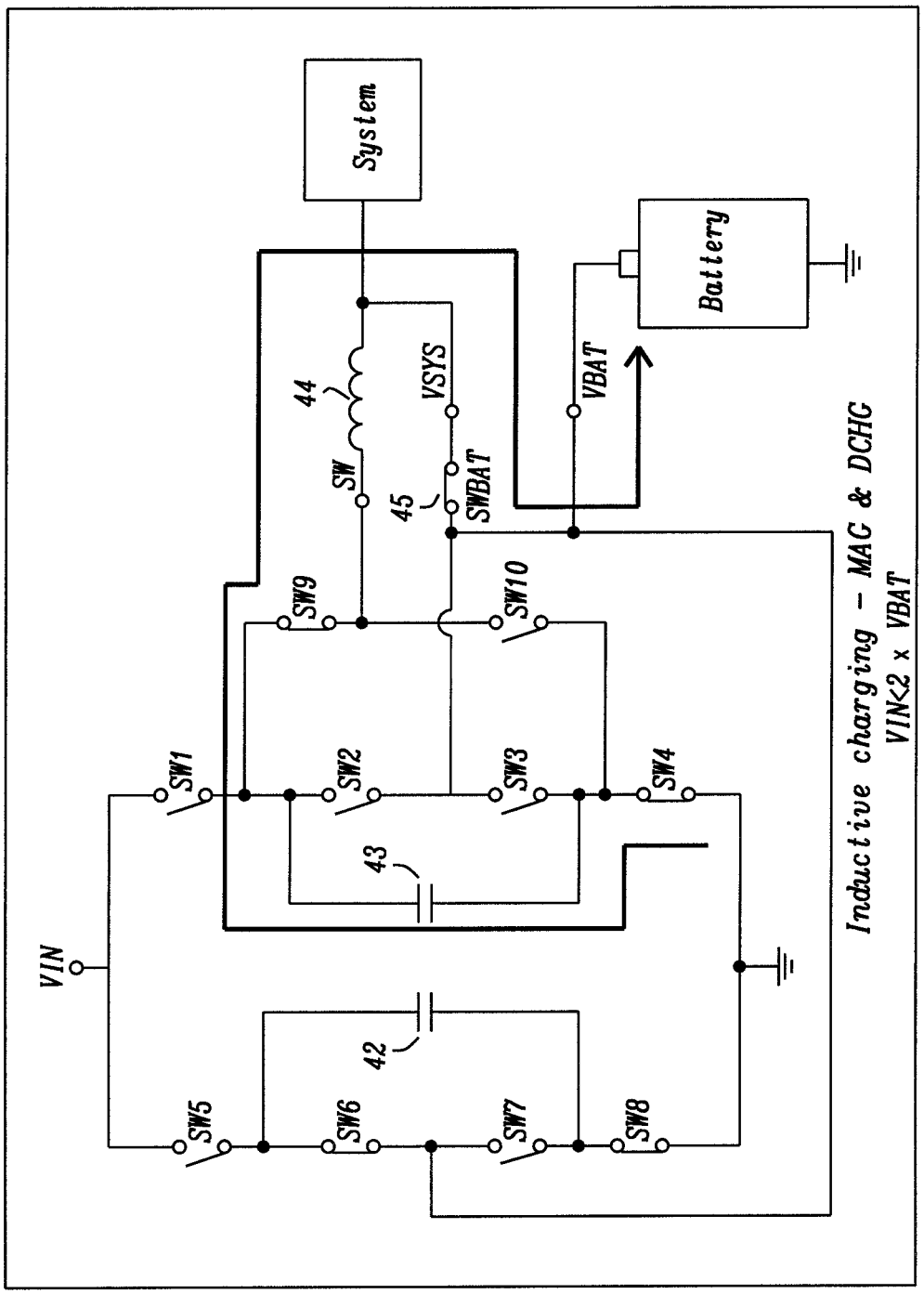
FIG. 11 shows current flows during inductive charging of an external battery.
Figure 12:
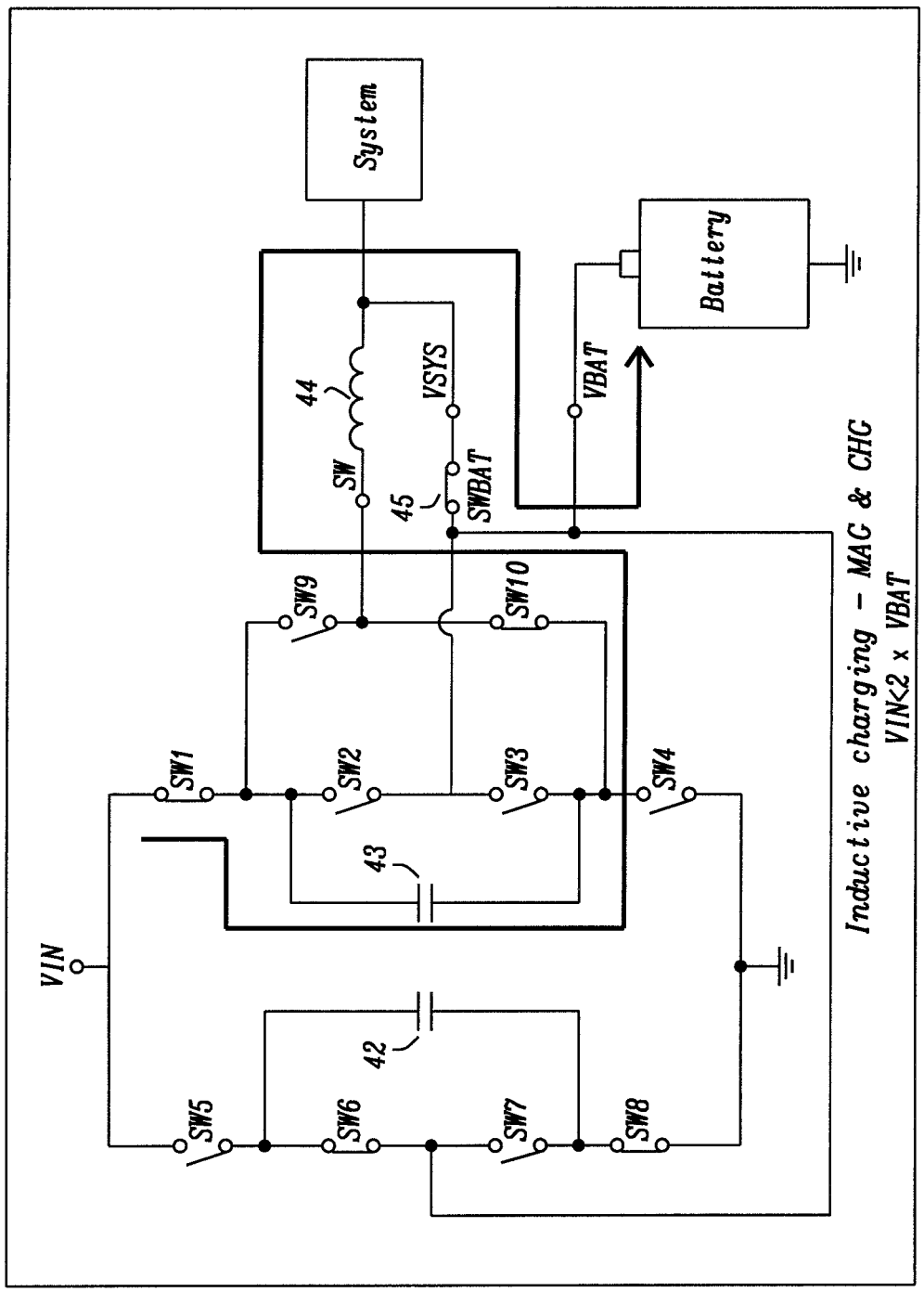
FIG. 12 shows current flows during inductive charging of an external battery.
Figure 13:
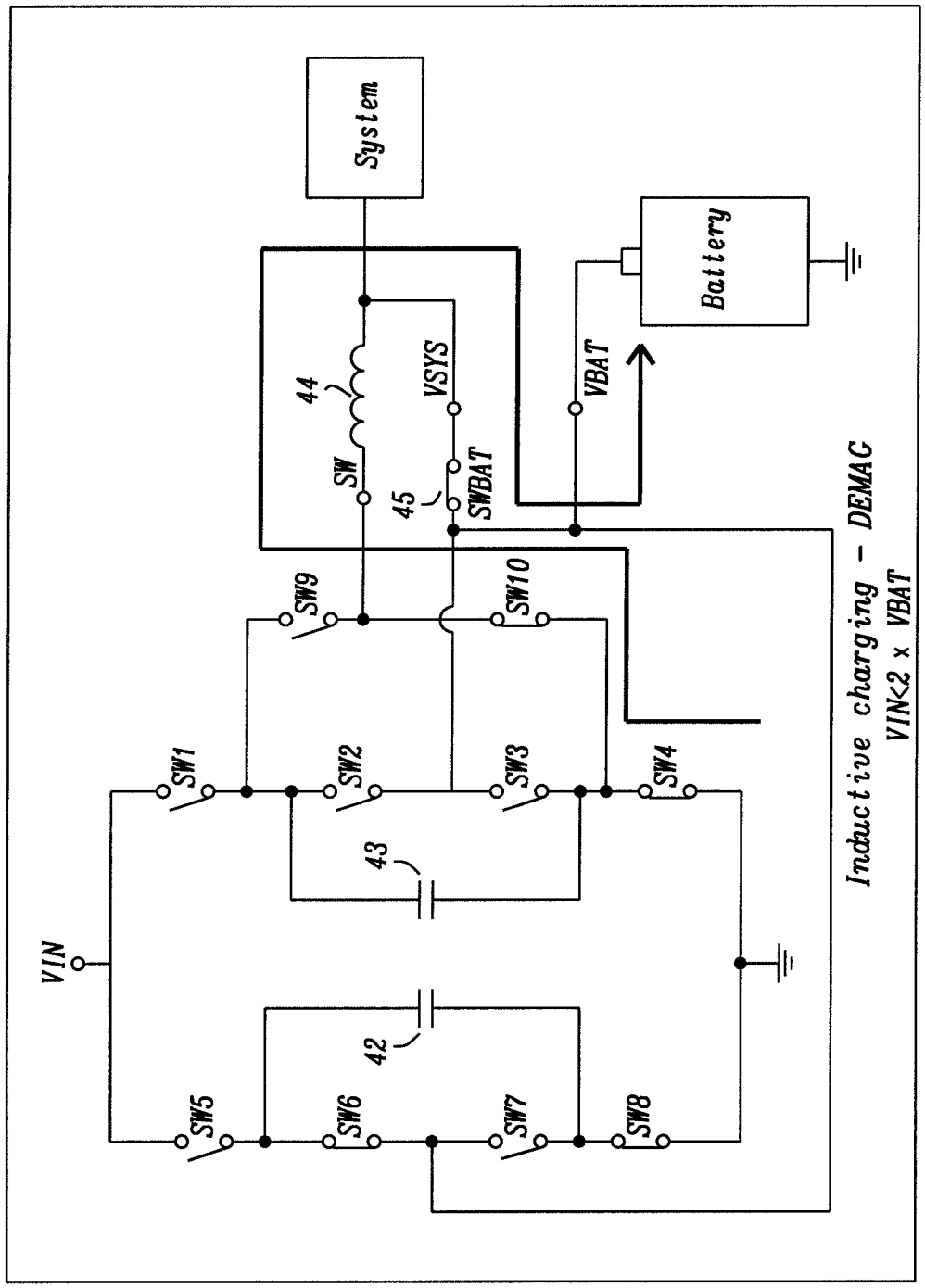
FIG. 13 shows current flows during inductive charging of an external battery.

FIGS. 11, 12, and 13 show current flows during inductive charging of an external battery. As can be seen in FIG. 11, during a first time interval, the power converter turns on the ground switch SW4 and the first inductive charging switch SW9, and turns off the input switch SW1 and the second inductive charging switch SW10 for generating an electrical path from the reference potential via the capacitor 43 and via the inductor 44 to the first output terminal. Then, in FIG. 12, during a second time interval, the power converter turns on the input switch SW1 and the second inductive charging switch, and turns off the ground switch and the first inductive charging switch for generating an electrical path from the input terminal via the capacitor and via the inductor to the first output terminal. Finally, in FIG. 13, during a third time interval, the power converter turns off the ground switch and the second inductive charging switch, and turns on the input switch and the first inductive charging switch for generating an electrical path from the input terminal via the inductor to the first output terminal. By switching between the described switching states, the power converter supplies electrical power with a regulated output voltage to the first output terminal. As in FIGS. 11, 12, and 13, the output switch is turned on, the voltage-stabilized electrical power is also delivered to the battery at the second output terminal of the power converter 40.

Figure 14:
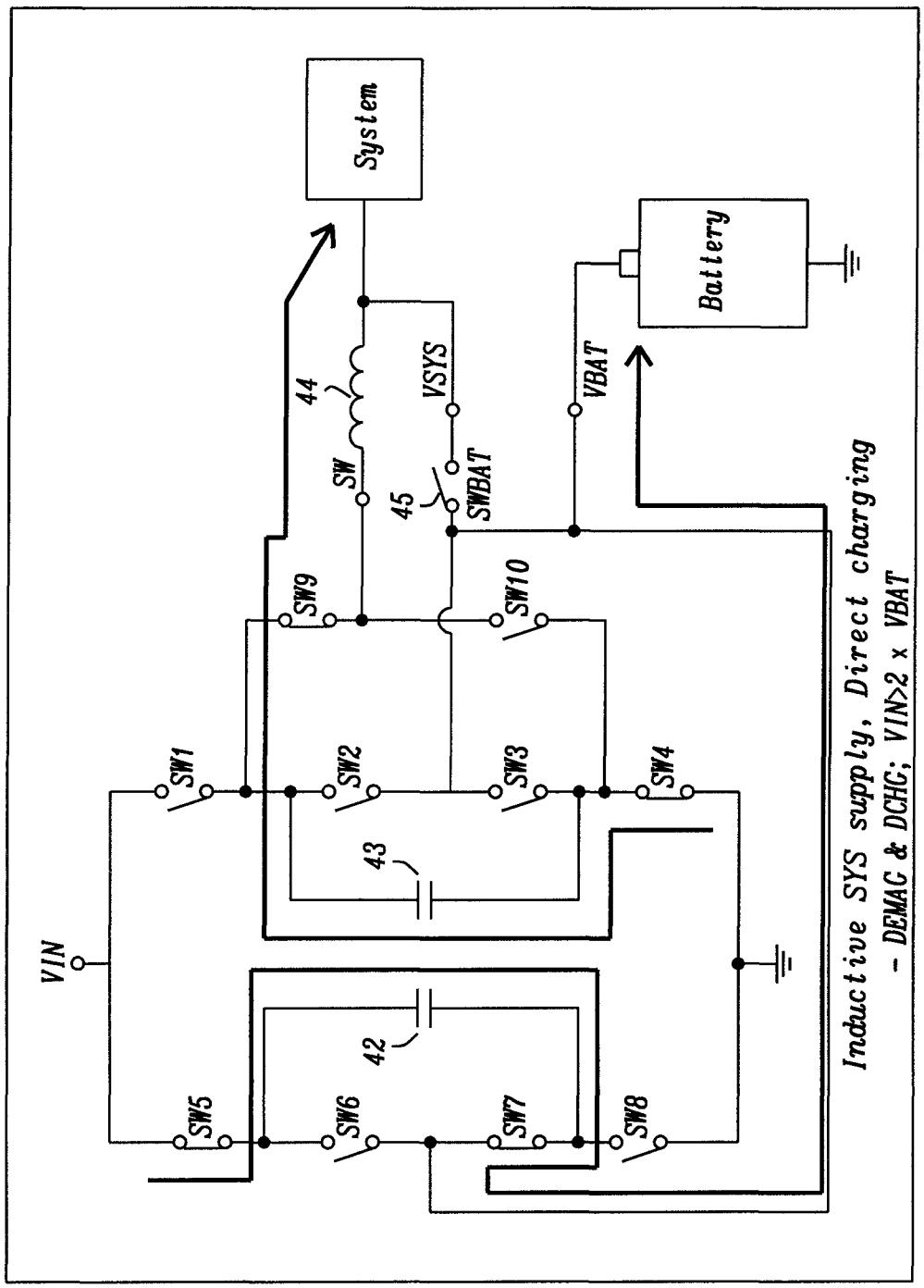
FIG. 14 shows current flows during capacitive charging of an external battery while the inductive charger supplies a stable output voltage to an external system.
Figure 15:
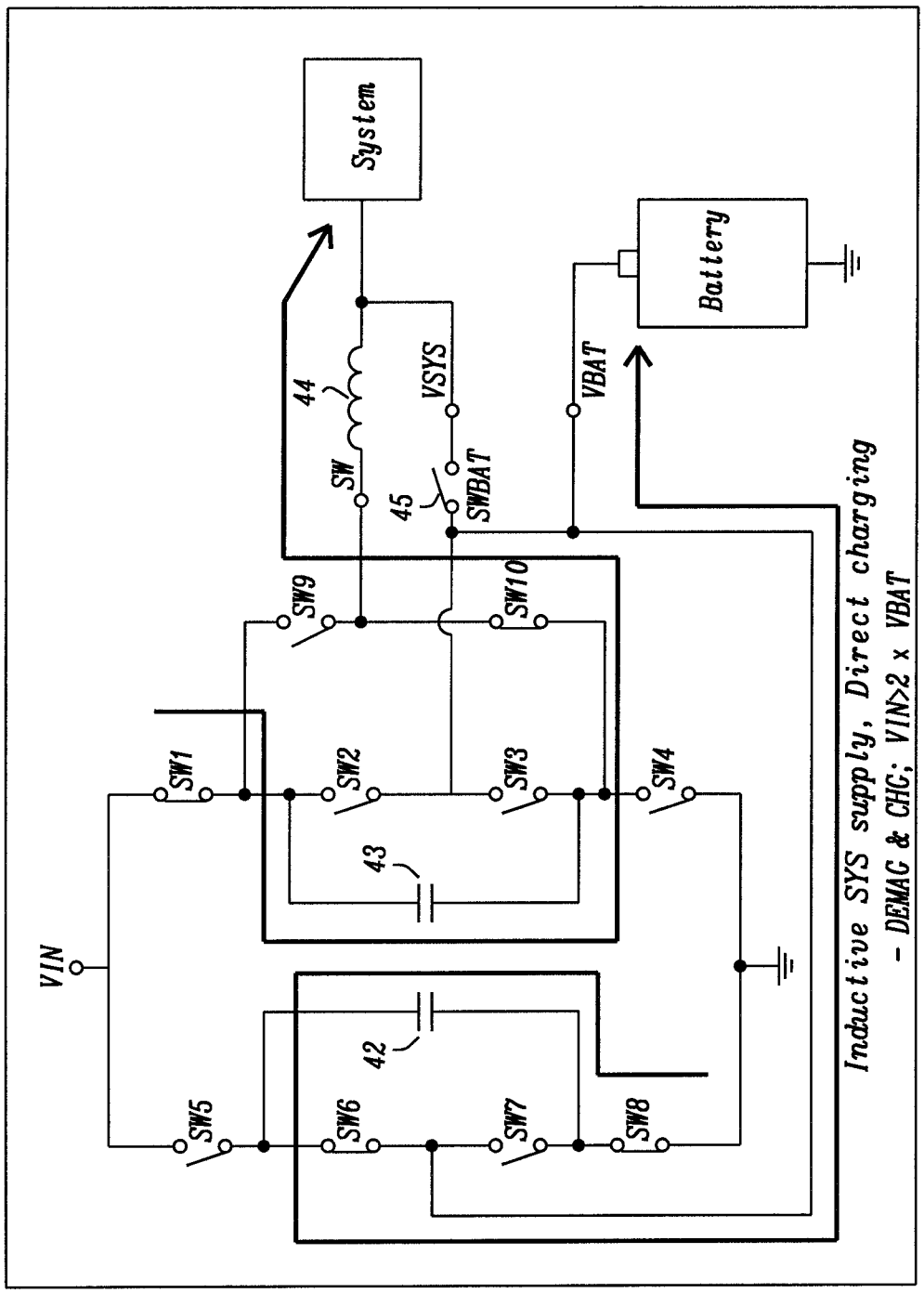
FIG. 15 shows current flows during capacitive charging of an external battery while the inductive charger supplies a stable output voltage to an external system.
Figure 16:
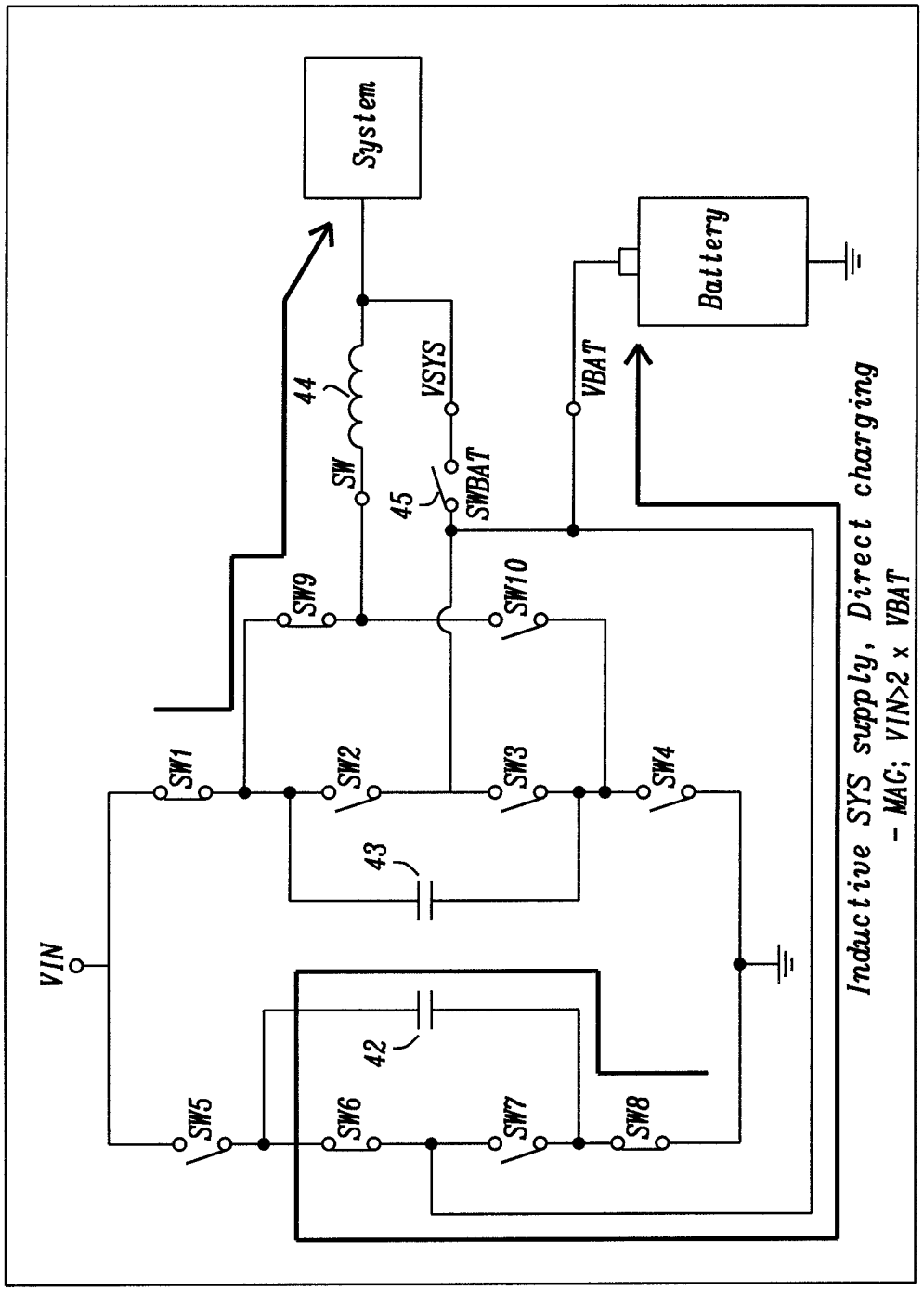
FIG. 16 shows current flows during capacitive charging of an external battery while the inductive charger supplies a stable output voltage to an external system.

FIGS. 14, 15, and 16 show current flows during capacitive charging of an external battery while the inductive charger supplies a stable output voltage to an external system. In this scenario, the output switch 45 is turned off. The inductive charging is achieved using a similar switching pattern as described with regard to FIGS. 11, 12, and 13, with the exception that during the third time interval, an electrical path is formed from the input terminal to the first output terminal. This system allows to supply VSYS and charge the battery at the same time. Here are a few scenarios where this is useful: (a) Precharge, wherein the optional left-side branch may required to precharge and supply system power at the same time and independently of each other, (b) CV and end of charge, wherein the optional left-side branch is required to precharge and supply system power at the same time and independently of each other, and (c) After charging is done, when the battery is full, wherein the left-side may not be required for this function.

Figure 17:
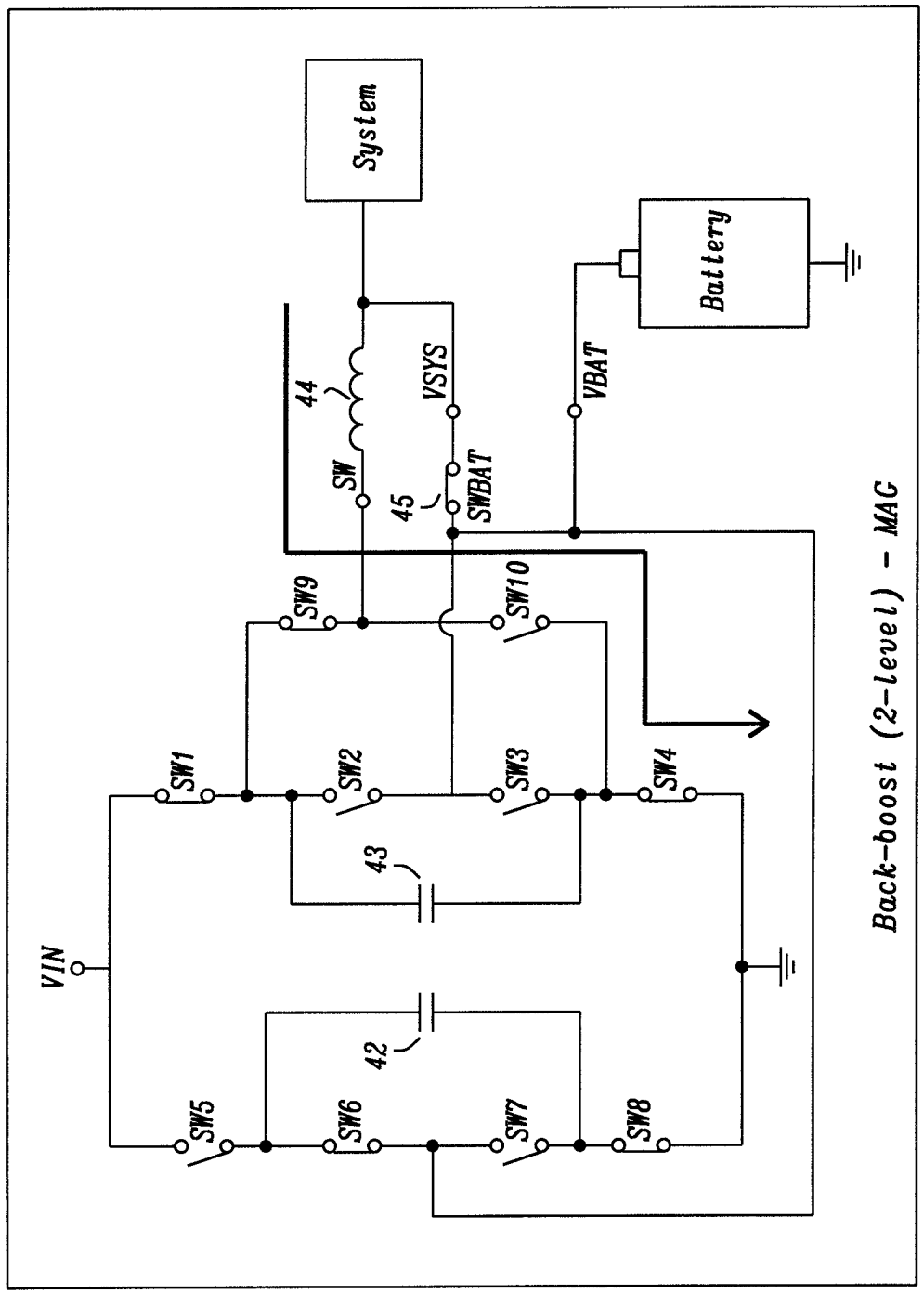
FIG. 17 shows current flows during back-boosting according to a first switching scheme.
Figure 18:
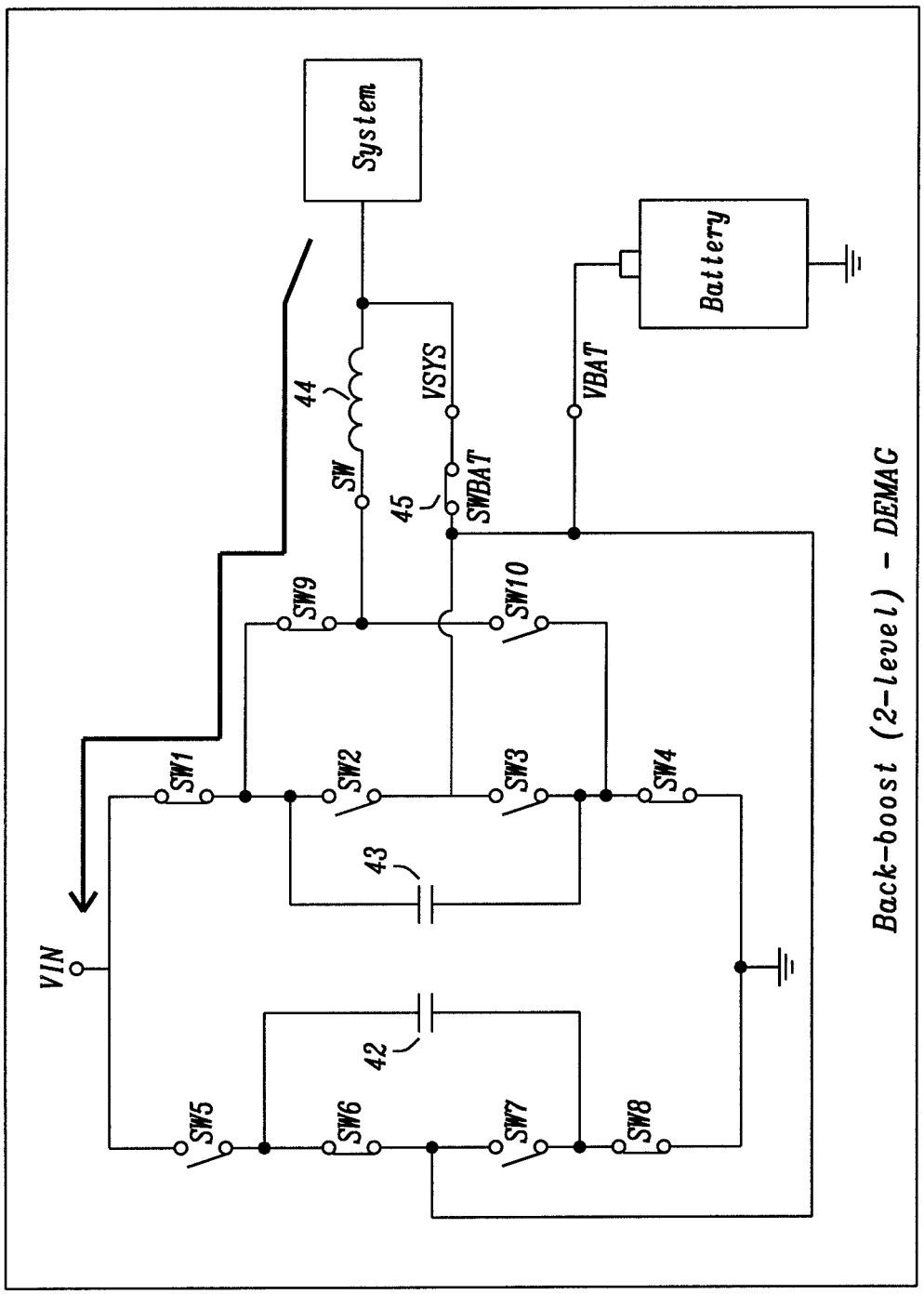
FIG. 18 shows current flows during back-boosting according to the first switching scheme.
Figure 19:
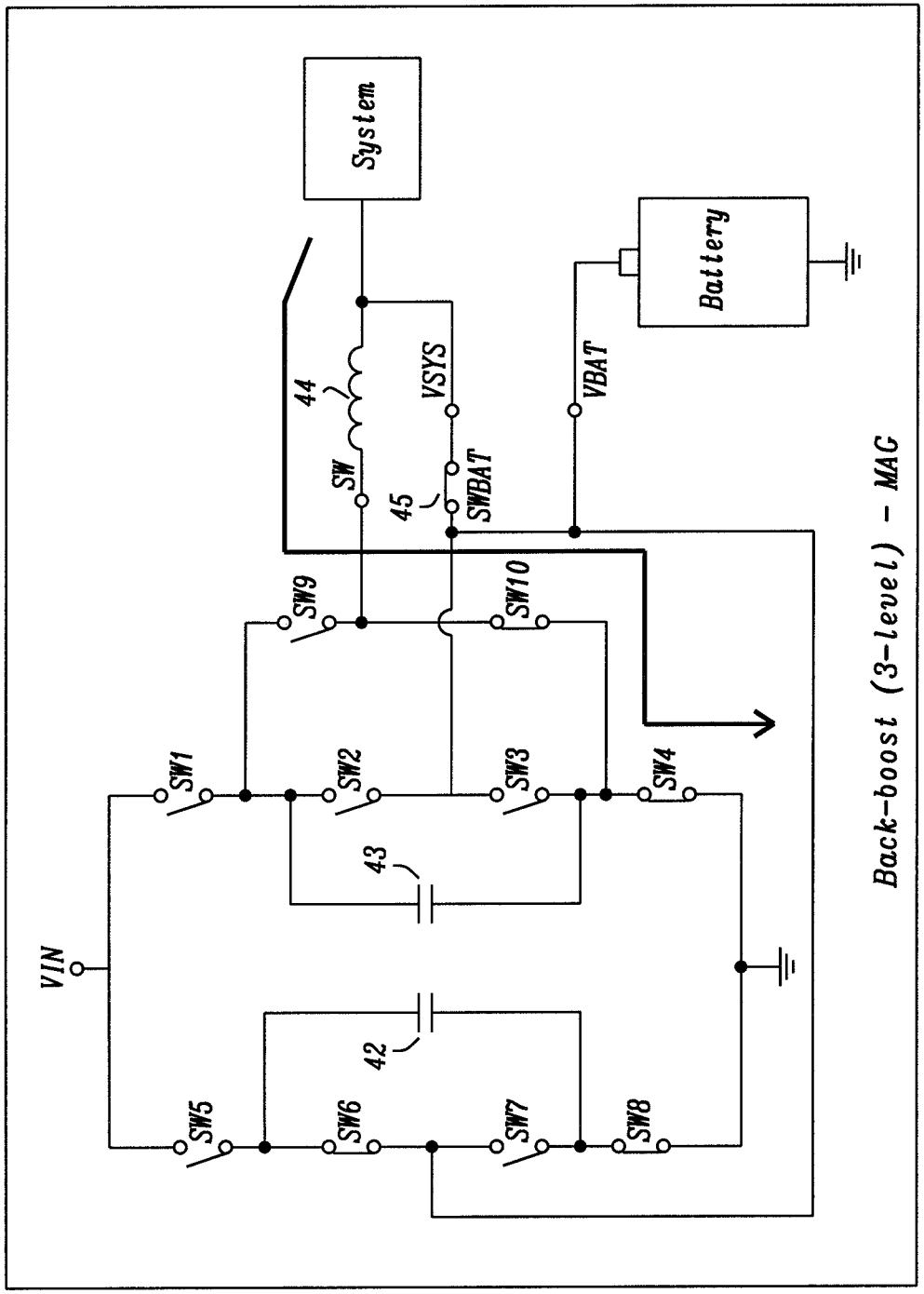
FIG. 19 shows current flows during back-boosting according to a second switching scheme.
Figure 20:
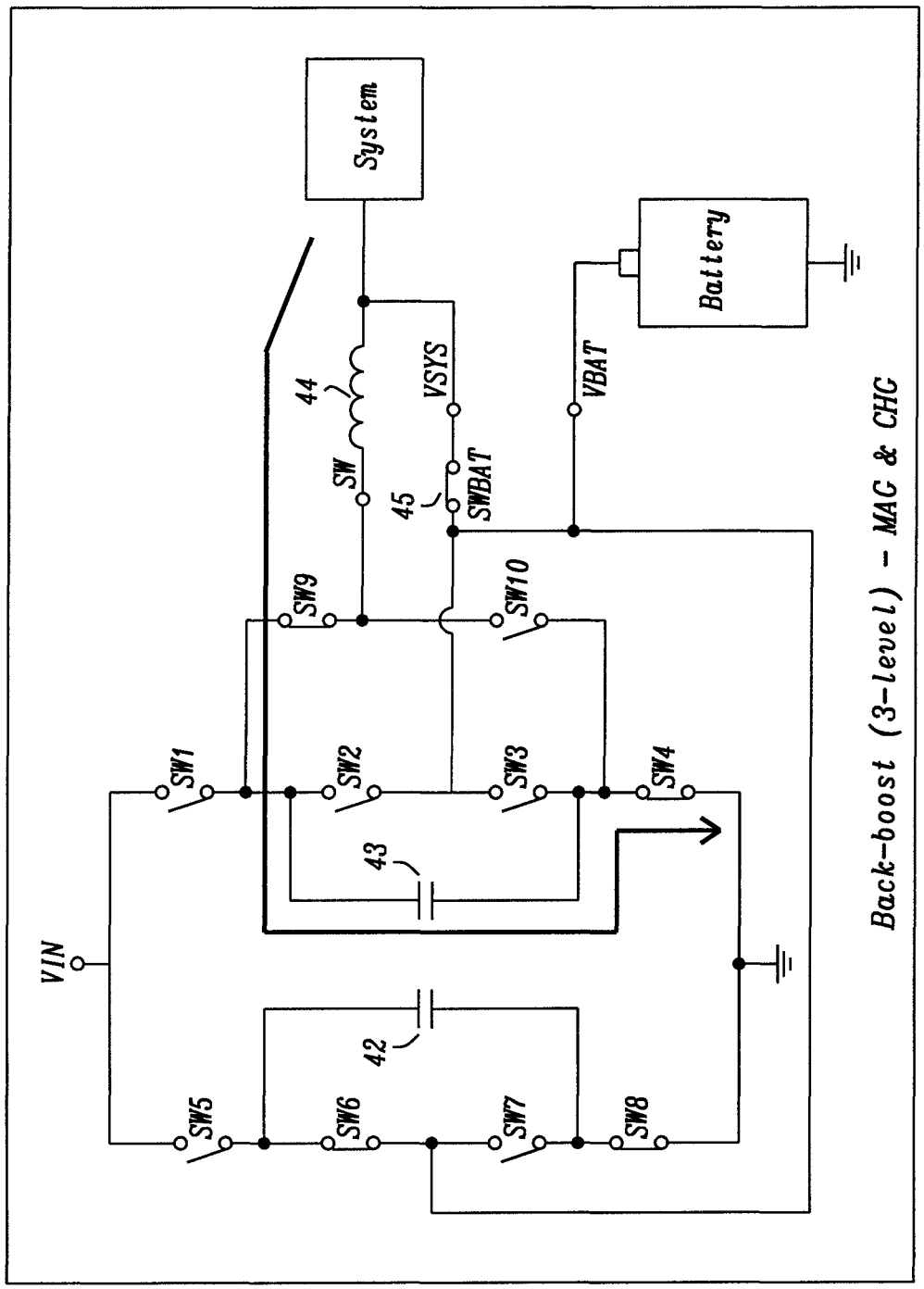
FIG. 20 shows current flows during back-boosting according to the second switching scheme.
Figure 21:
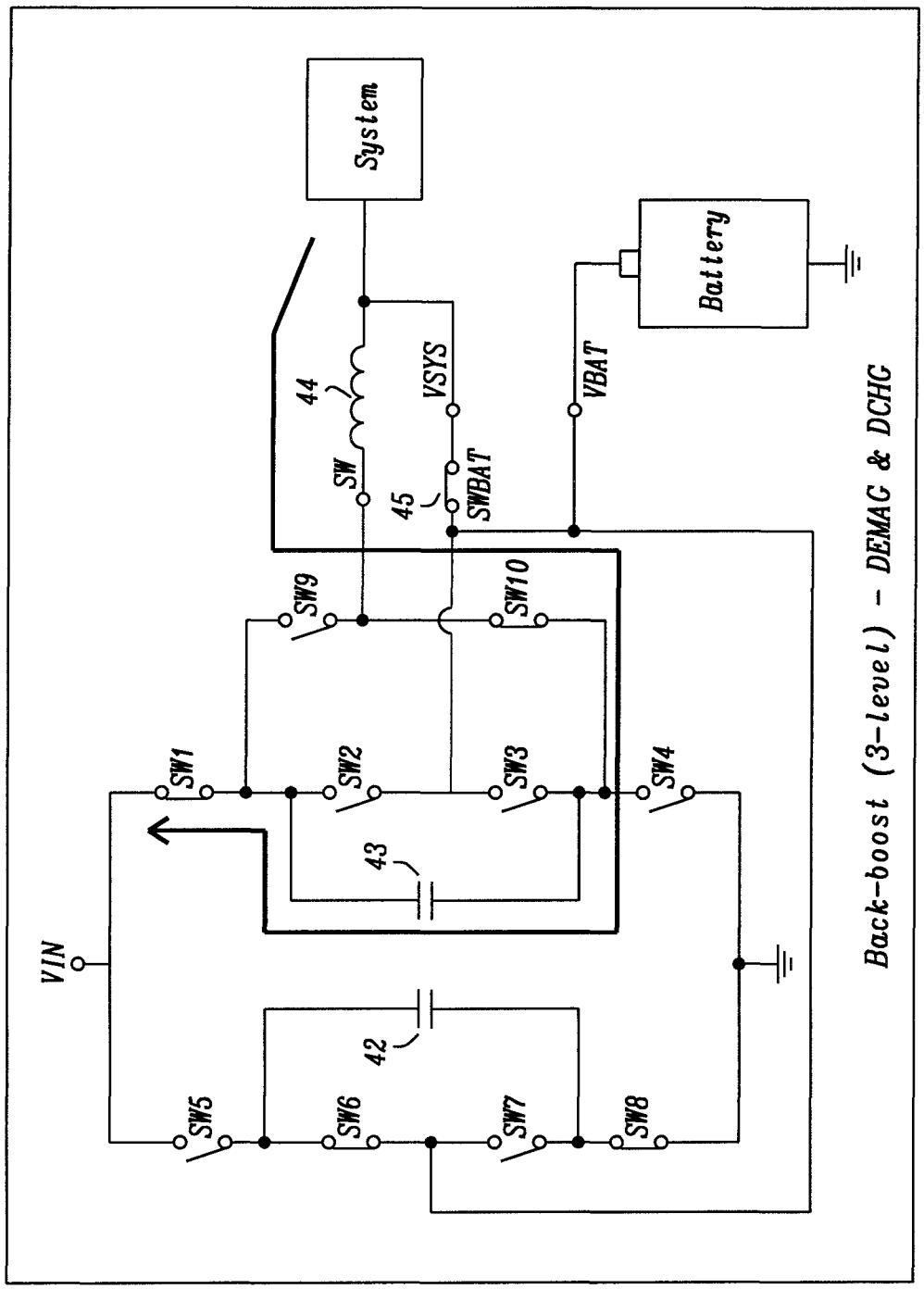
FIG. 21 shows current flows during back-boosting according to the second switching scheme.

When at the input terminal of the power converter 40 there is a power sink instead of a power source and the battery is connected on the output of the charger, the battery power may be back-boosted to provide power to the input. Two methods are presented in this disclosure: 2-level boost and 3-level boost. FIGS. 17 and 18 show current flows during back-boosting according to the first switching scheme (2-level boost), whereas FIGS. 19, 20, 21 show current flows during back-boosting according to the second switching scheme (3-level boost). Two-level boosting has two phases: magnetizing the inductor 44 and then demagnetizing by boosting the power towards the input terminal VIN. During both phases, the flying capacitor 43 that was used by the multi-level inductive charger is being connected between the input terminal VIN and the reference potential (ground), and acts as an output capacitor for the (back) boost converter. Three-level boosting has three phases. This is specific to a 3-level boost using an inductor and a flying capacitor.

A battery charging circuit needs to also protect the battery from un-controlled discharging in case a load is being connected to the input terminal or VIN is shorted to ground. This feature is called "Reverse Current Protection" (RCP). Usually, a battery charger uses one extra power FET (switch) connected in series with its input, which is also called "RCP FET". When this switch is turned off, there is no current from the output to the input. The RCP FET is turned on during charging and back boosting, but it increases the total power losses in the circuit.

Figure 22:
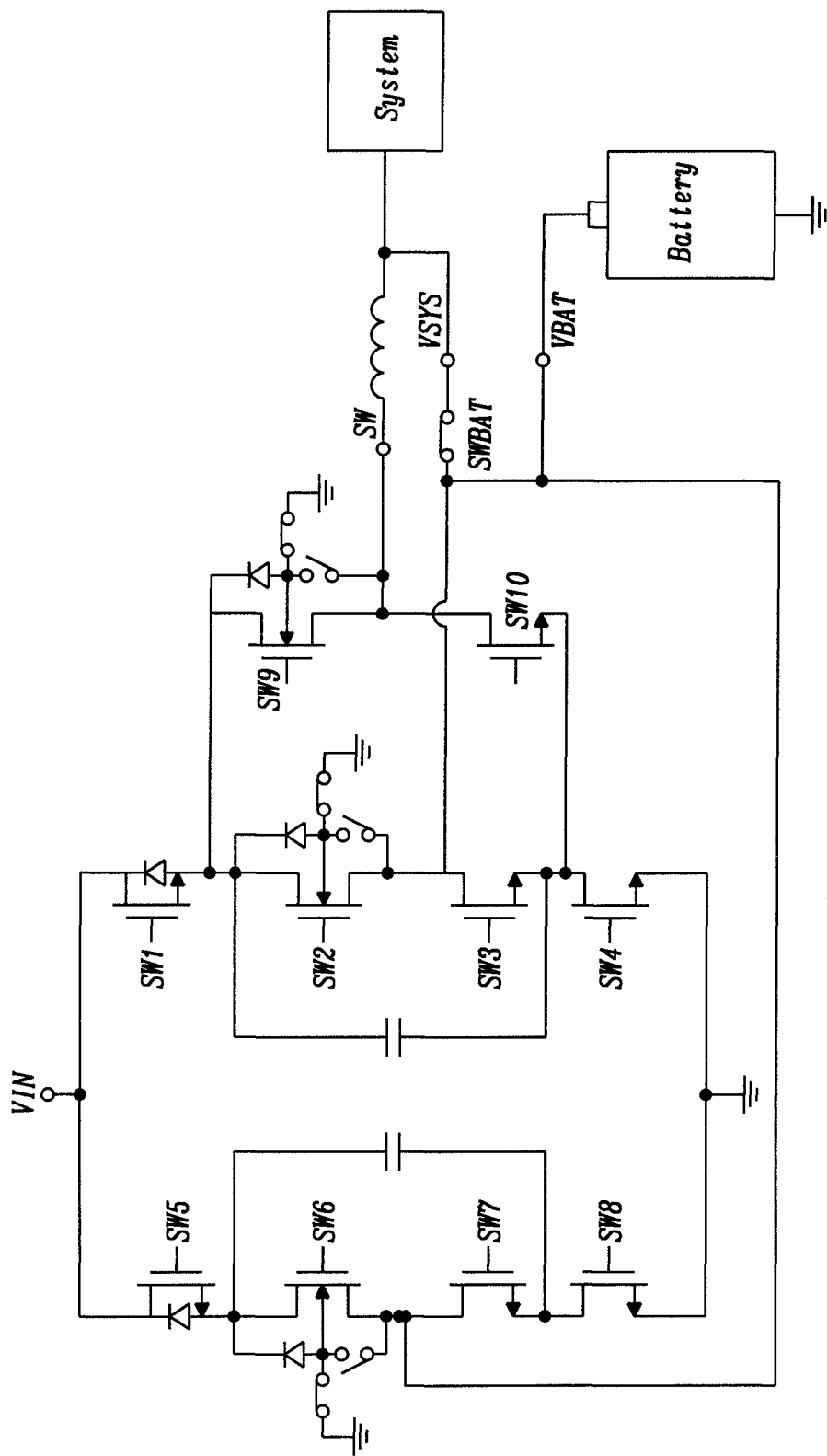
FIG. 22 shows a power converter with reverse current protection.

FIG. 22 shows a power converter with reverse current protection. In general, the circuit presented in this disclosure may achieve RCP within the described power FETs. In order to show the RCP method, let's consider the circuit under this disclosure using N-type power FETs for its switches (without loss of generality). In FIG. 22, the body diodes of SW1, SW2, SW5, SW6 and SW9 are also represented, as they create the main paths for reverse current. While the power converter is switching, the body of SW2, SW6 and SW9 need to be connected to their transistors' sources, to cancel the body bias effect which would increase power losses. When the charger is off and the output switch SWBAT is on (to provide power from VBAT to VSYS), the charger circuit needs to prevent un-controlled current flow from battery to the input. In case there is a load on VIN which lowers VIN voltage below VBAT/VSYS (or even a short on VIN to ground), the body diodes of SW1, SW2, SW5, SW6 and SW9 will start conducting current from battery towards the input. The idea of the present disclosure is to switch the body of SW2, SW6 and SW9 to ground when the charger is not in use for charging or for back-boosting. This will effectively prevent current flow from battery to input without additional power FETs in series with the charger.

Figure 23:
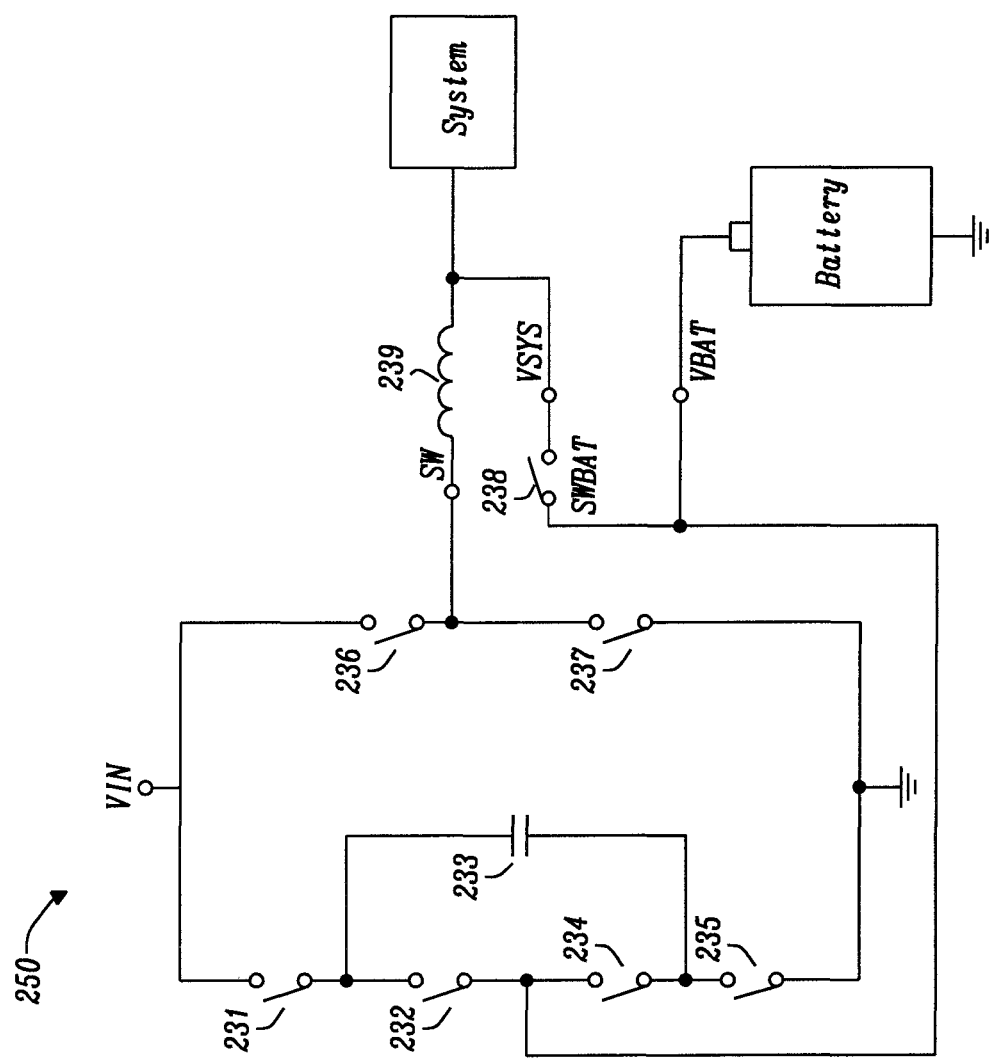
FIG. 23 shows another exemplary power converter with a direct capacitive charger and an indirect inductive charger.

FIG. 23 shows another exemplary power converter 230 with a direct capacitive charger and an indirect inductive charger. Power converter 230 has an input terminal, a capacitor 233, a first output terminal, a second output terminal, an output switch 238 between the first output terminal and the second output terminal, and an inductor 239, wherein a first terminal of the inductor 239 is connected to the first output terminal. The power converter 230 has a first inductive charging switch 236 connected between the input terminal and a second terminal of the inductor. The power converter has a second inductive charging switch 237 connected between the second terminal of the inductor and a reference potential. The power converter has a first capacitive charging switch 231 connected between the input terminal and a first terminal of the capacitor 233. The power converter has a second capacitive charging switch 232 connected between the first terminal of the capacitor 233 and the second output terminal. The power converter has a third capacitive charging switch 234 connected between the second output terminal and a second terminal of the capacitor. The power converter has a fourth capacitive charging switch 235 connected between the second terminal of the capacitor and the reference potential. Power converter 230 may be especially valuable during precharging and in an EOC phase.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter with an input terminal, a capacitor, a first output terminal, a second output terminal, an output switch between the first output terminal and the second output terminal, and an inductor, wherein a first terminal of the inductor is connected to the first output terminal, the power converter further comprising:
an input switch connected between the input terminal and a first terminal of the capacitor;
a first capacitive charging switch connected between the first terminal of the capacitor and the second output terminal;
a second capacitive charging switch connected between the second output terminal and a second terminal of the capacitor;
a ground switch connected between the second terminal of the capacitor and a reference potential; and
a series connection of a first inductive charging switch and a second inductive charging switch connected between the first terminal of the capacitor and the second terminal of the capacitor, wherein a second terminal of the inductor is connected to an Intermediate node between the first inductive charging switch and the second inductive charging switch,
wherein the first inductive charging switch is connected between the second terminal of the inductor and a first intermediate node between the input switch and the first capacitive switch, and wherein the second inductive charging switch is connected between the second terminal of the inductor and a second intermediate node between the ground switch and the second capacitive charging switch.

2. The power converter of claim 1, wherein the power converter is configured to convert electrical power at the Input terminal into
electrical power for powering an external electronic device at the first output terminal, or into
electrical power for charging an external energy storage device at the second output terminal.

3. The power converter of claim 1, wherein the power converter is configured, when in a capacitive charging mode,
to turn off the output switch, the first inductive charging switch and the second inductive charging switch, and
to control the remaining switches such that an external storage device connected to the second output terminal is charged with a constant charging current.

4. The power converter of claim 1, wherein the power converter is further configured to alternate between a first phase and a second phase, wherein the power converter is configured, during the first phase,
to turn on the input switch and the second capacitive charging switch, and
to turn off the first capacitive charging switch and the ground switch for generating an electrical path from the input terminal via the capacitor to the second output terminal;
and wherein the power converter is configured, during the second phase,
to turn on the ground switch and the first capacitive charging switch, and
to turn off the input switch and the second capacitive charging switch for generating an electrical path from the reference potential via the capacitor to the second output terminal.

5. The power converter of claim 1, wherein the power converter is configured, when in an inductive charging mode,
to turn off the first capacitive charging switch and the second capacitive charging switch, and
to control the remaining switches for regulating an output voltage at the first output terminal or at the second output terminal.

6. The power converter of claim 5, wherein the power converter is configured to alternate between a first time interval, a second time interval, and a third time interval, wherein the power converter is configured to, during the first time interval,
to turn on the ground switch and the first inductive charging switch, and
to turn off the input switch and the second inductive charging switch for generating an electrical path from the reference potential via the capacitor and via the inductor to the first output terminal,
wherein the power converter is configured, during the second time interval,
to turn on the input switch and the second inductive charging switch, and
to turn off the ground switch and the first inductive charging switch for generating an electrical path from the input terminal via the capacitor and via the inductor to the first output terminal,
and wherein the power converter is configured, during the third time interval,
to turn off the ground switch and the second inductive charging switch, and
to turn on the input switch and the first inductive charging switch for generating an electrical path from the input terminal via the inductor to the first output terminal.

7. The power converter of claim 1, wherein the power converter is configured, when in an inductive charging mode
to turn on the output switch,
to turn off the first capacitive charging switch and the second capacitive charging switch, and
to control the remaining switches such that an external storage device connected to the second output terminal is charged with a constant charging voltage or such that a constant charging voltage is provided at the first output terminal.

8. The power converter of claim 6, wherein the power converter is configured, during a third time interval,
to turn on the ground switch and the second inductive charging switch, and
to turn off the input switch and the first inductive charging switch for generating an electrical path from the reference potential via the inductor to the second output terminal.

9. The power converter of claim 4, wherein the power converter further comprises a second capacitor, a third capacitive charging switch, a fourth capacitive charging switch, a fifth capacitive charging switch, and a sixth capacitive charging switch, wherein
the third capacitive charging switch is connected between the input terminal and a first terminal of the second capacitor;
the fourth capacitive charging switch Is connected between the first terminal of the second capacitor and the second output terminal;
the fifth capacitive charging switch is connected between the second output terminal and a second terminal of the second capacitor; and
the sixth capacitive charging switch is connected between the second terminal of the second capacitor and the reference potential.

10. The power converter of claim 9, wherein the power converter is further configured to, during the second phase,
to turn on the third capacitive charging switch and the fifth capacitive charging switch, and
to turn off the fourth capacitive charging switch and the sixth capacitive charging switch for generating an electrical path from the input terminal via the inductor to the second output terminal,
and, during the first phase,
to turn off the third capacitive charging switch and the fifth capacitive charging switch, and
to turn on the fourth capacitive charging switch and the sixth capacitive charging switch for generating an electrical path from the reference potential via the inductor to the second output terminal.

11. The power converter of claim 9, wherein the third capacitive charging switch or the fourth capacitive charging switch is implemented as a transistor and the power converter is configured to turn off said transistor if a transistor current through said transistor falls below a threshold value.

12. The power converter of claim 11, wherein the power converter further comprises a comparator configured to compare the transistor current with the threshold value.

13. The power converter of claim 1, wherein the power converter is configured to, in a back-boost mode, to turn off the first and the second capacitive charging switches and to switch between
a magnetizing switching state in which the second inductive charging switch and the ground switch are turned on, and
a demagnetizing switching state in which the input switch and the first inductive charging switch are turned on.

14. The power converter of claim 1, wherein the power converter is configured to, in a back-boost mode, to turn off the first and the second capacitive charging switches and to switch between
a primary switching state in which the second inductive charging switch and the ground switch are turned on,
a secondary switching state in which the first inductive charging switch and the ground switch are turned on, and
a tertiary switching state in which the second inductive charging switch and the input switch are turned on.

15. The power converter of claim 1, wherein the power converter further comprises
a first reverse current protection switch configured to connect a body of the first capacitive charging switch to a first reference potential, and
a second reverse current protection switch configured to connect a body of the first inductive charging switch to a second reference potential.

16. A method for operating a power converter with an input terminal, a capacitor, a first output terminal, a second output terminal, an output switch between the first output terminal and the second output terminal, and an inductor, wherein a first terminal of the inductor is connected to the first output terminal, the method comprising:
connecting an input switch between the input terminal and a first terminal of the capacitor;
connecting a first capacitive charging switch between the first terminal of the capacitor and the second output terminal;
connecting a second capacitive charging switch between the second output terminal and a second terminal of the capacitor;
connecting a ground switch between the second terminal of the capacitor and a reference potential;
connecting a series connection of a first inductive charging switch and a second inductive charging switch between the first terminal of the capacitor and the second terminal of the capacitor; and
connecting the second terminal of the inductor to an Intermediate node between the first inductive charging switch and the second inductive charging switch,
wherein the first inductive charging switch is connected between the second terminal of the inductor and a first intermediate node between the input switch and the first capacitive switch, and wherein the second inductive charging switch is connected between the second terminal of the inductor and a second intermediate node between the ground switch and the second capacitive charging switch.

17. The method of claim 16, further comprising converting electrical power at the input terminal into
electrical power for powering an external electronic device at the first output terminal, or into
electrical power for charging an external energy storage device at the second output terminal.

18. The method of claim 16, further comprising, in a capacitive charging mode,
turning off the output switch, the first inductive charging switch and the second inductive charging switch, and
controlling the remaining switches such that an external storage device connected to the second output terminal is charged with a constant charging current.

19. The method of claim 16, further comprising, in an inductive charging mode,
turning off the first capacitive charging switch and the second capacitive charging switch, and
controlling the remaining switches for regulating an output voltage at the first output terminal.

20. The method of claim 16, further comprising
turning on the output switch, and
controlling the remaining switches such that an external storage device connected to the second output terminal is charged with a constant charging voltage.

* * * * *